(12) United States Patent
Wieder

(10) Patent No.: US 9,310,887 B2
(45) Date of Patent: Apr. 12, 2016

(54) HANDHELD AND WEARABLE REMOTE-CONTROLLERS

(76) Inventor: James W. Wieder, Ellicott City, MD (US)

( * ) Notice: Subject to any disclaimer, the term of this patent is extended or adjusted under 35 U.S.C. 154(b) by 511 days.

(21) Appl. No.: 13/102,537

(22) Filed: May 6, 2011

(65) Prior Publication Data
US 2016/0011660 A1    Jan. 14, 2016

Related U.S. Application Data

(60) Provisional application No. 61/332,186, filed on May 6, 2010.

(51) Int. Cl.
| | |
|---|---|
| H04L 17/02 | (2006.01) |
| G06F 3/01 | (2006.01) |
| G06F 3/038 | (2013.01) |
| G06F 3/0346 | (2013.01) |
| H04N 5/44 | (2011.01) |
| H04N 21/422 | (2011.01) |
| H04N 21/4227 | (2011.01) |
| H04N 21/436 | (2011.01) |
| H04N 21/442 | (2011.01) |
| H04N 21/41 | (2011.01) |

(52) U.S. Cl.
CPC ............. *G06F 3/014* (2013.01); *G06F 3/0346* (2013.01); *G06F 3/0383* (2013.01); *H04N 5/4403* (2013.01); *H04N 21/4221* (2013.01); *H04N 21/4227* (2013.01); *H04N 21/42207* (2013.01); *H04N 21/42221* (2013.01); *H04N 21/42222* (2013.01); *H04N 21/42225* (2013.01); *H04N 21/42228* (2013.01); *H04N 21/43615* (2013.01); *H04N 21/44227* (2013.01); *H04N 21/4131* (2013.01); *H04N 2005/4428* (2013.01)

(58) Field of Classification Search
USPC ........................................ 340/12.22; 341/176
See application file for complete search history.

(56) References Cited

U.S. PATENT DOCUMENTS

| | | | |
|---|---|---|---|
| 3,541,541 A | 11/1970 | Engelbart et al. |
| 4,787,051 A | 11/1988 | Olson |
| 4,839,838 A | 6/1989 | LaBiche et al. |
| 4,862,152 A | 8/1989 | Milner |
| 4,988,981 A | 1/1991 | Zimmerman et al. |
| 5,138,154 A | 8/1992 | Hotelling |
| 5,181,181 A | 1/1993 | Glynn |
| 5,359,348 A | 10/1994 | Pilcher et al. |
| 5,440,326 A | 8/1995 | Quinn |

(Continued)

*Primary Examiner* — Naomi Small
(74) *Attorney, Agent, or Firm* — James W. Wieder

(57) ABSTRACT

An apparatus and method for the remote control and/or interaction-with one or more electronic-devices. A remote-controller that contains motion sensors (e.g., accelerometers; inertial sensors; MEMS sensors) may be held-by or worn-by a user. When the remote-control mode is activated, selection-menus (containing selectable-objects) along with a cursor (or point-of-action) may be presented to the user on an active-display(s). When the remote-controller is moved in one or more dimensions in space, a cursor or point-of-action is moved by a related amount on the active-display. A user may move the remote-controller in-order to position a cursor or point-of-action, on or near a desired selectable-object on the active-display(s). Corresponding to the user's selection(s); control action(s) may be performed on the device(s) being controlled/interacted-with. A single remote-controller is able to control multiple electronic devices. In one embodiment, a remote-controller has a single button and is able to control a plurality of electronic-devices.

35 Claims, 19 Drawing Sheets

(56) References Cited

U.S. PATENT DOCUMENTS

| | | | |
|---|---|---|---|
| 5,444,462 A | 8/1995 | Wambach | |
| 5,459,489 A | 10/1995 | Redford | |
| 5,481,265 A | 1/1996 | Russell | |
| 5,489,922 A | 2/1996 | Zloof | |
| 5,506,605 A | 4/1996 | Paley | |
| 5,545,857 A | 8/1996 | Lee et al. | |
| 5,638,092 A | 6/1997 | Eng et al. | |
| 5,675,827 A * | 10/1997 | Bannai | G06F 17/24 715/209 |
| 5,703,623 A | 12/1997 | Hall et al. | |
| 5,734,371 A | 3/1998 | Kaplan | |
| 5,825,350 A | 10/1998 | Case, Jr. et al. | |
| 5,835,156 A | 11/1998 | Blonstein et al. | |
| 5,898,421 A | 4/1999 | Quinn | |
| 6,016,144 A | 1/2000 | Blonstein et al. | |
| 6,097,374 A | 8/2000 | Howard | |
| 6,181,329 B1 | 1/2001 | Stork et al. | |
| 6,184,863 B1 | 2/2001 | Sibert et al. | |
| 6,227,068 B1 * | 5/2001 | Masui | B62K 23/02 200/61.85 |
| 6,501,515 B1 | 12/2002 | Iwamura | |
| 6,747,632 B2 | 6/2004 | Howard | |
| 6,753,849 B1 | 6/2004 | Curran et al. | |
| 6,870,526 B2 | 3/2005 | Zngf et al. | |
| 7,042,438 B2 | 5/2006 | McRae et al. | |
| 7,102,616 B1 | 9/2006 | Sleator | |
| 7,123,180 B1 | 10/2006 | Daniell et al. | |
| 7,158,118 B2 | 1/2007 | Liberty | |
| 7,236,156 B2 | 6/2007 | Liberty et al. | |
| 7,239,301 B2 | 7/2007 | Liberty et al. | |
| 7,260,789 B2 | 8/2007 | Hunleth et al. | |
| 7,262,760 B2 | 8/2007 | Liberty | |
| 7,443,381 B2 | 10/2008 | Mo | |
| 8,089,455 B1 | 1/2012 | Wieder | |
| 8,508,472 B1 | 8/2013 | Wieder | |
| 2003/0142065 A1 * | 7/2003 | Pahlavan | G06F 3/0346 345/156 |
| 2003/0184452 A1 * | 10/2003 | Goodgoll | G06F 3/0219 341/23 |
| 2004/0266419 A1 * | 12/2004 | Arling | G08C 17/00 455/420 |
| 2004/0268393 A1 | 12/2004 | Hunleth et al. | |
| 2005/0028206 A1 * | 2/2005 | Cameron | H04N 7/17309 725/46 |
| 2005/0044505 A1 * | 2/2005 | Laney | G09G 5/14 715/781 |
| 2005/0219213 A1 | 10/2005 | Cho et al. | |
| 2006/0113377 A1 * | 6/2006 | Wilcox | G06K 19/0705 235/380 |
| 2006/0118706 A1 * | 6/2006 | Hisakawa | A63F 13/06 250/221 |
| 2006/0250353 A1 | 11/2006 | Yasutake | |
| 2007/0139370 A1 | 6/2007 | Lu et al. | |
| 2007/0176820 A1 * | 8/2007 | Vidal | G08C 17/02 341/176 |
| 2007/0176896 A1 | 8/2007 | Gritton et al. | |
| 2007/0262958 A1 * | 11/2007 | Cai | G06F 3/033 345/158 |
| 2008/0084385 A1 * | 4/2008 | Ranta | G06F 3/0346 345/157 |
| 2009/0051824 A1 * | 2/2009 | Satou | G08C 17/00 348/734 |
| 2009/0322676 A1 * | 12/2009 | Kerr | G06F 3/0346 345/158 |
| 2010/0149095 A1 * | 6/2010 | Hwang | G06F 3/0481 345/157 |
| 2010/0180298 A1 * | 7/2010 | Kim | H04N 5/4403 725/39 |
| 2010/0225580 A1 * | 9/2010 | Yoon | G06F 3/0304 345/157 |
| 2010/0253619 A1 * | 10/2010 | Ahn | G06F 3/012 345/157 |
| 2011/0013005 A1 * | 1/2011 | Watkins | A61B 1/00039 348/77 |
| 2011/0080340 A1 * | 4/2011 | Campesi | G06F 3/0304 345/158 |
| 2011/0149159 A1 * | 6/2011 | Candelore | H04N 5/44582 348/563 |
| 2011/0199303 A1 * | 8/2011 | Simpson | G06F 3/011 345/158 |

* cited by examiner

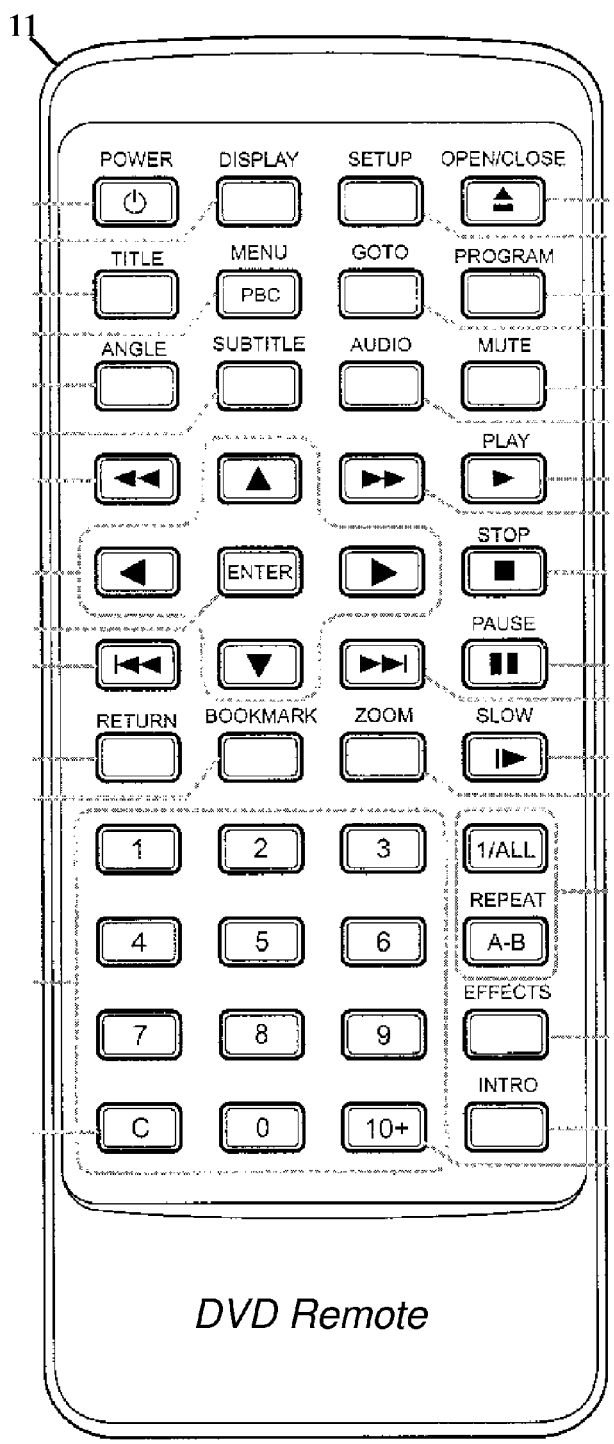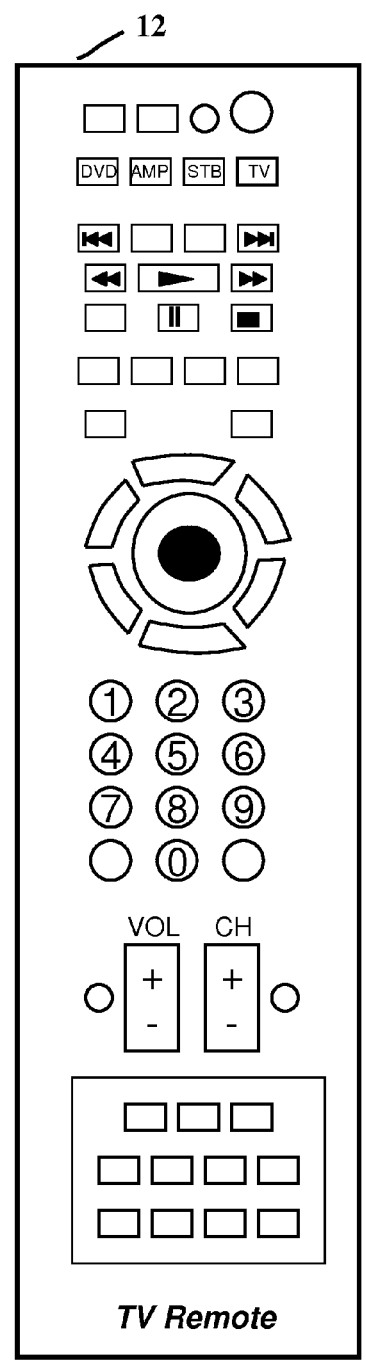
Prior Art Fig. 0a
DVD Remote
TV Remote

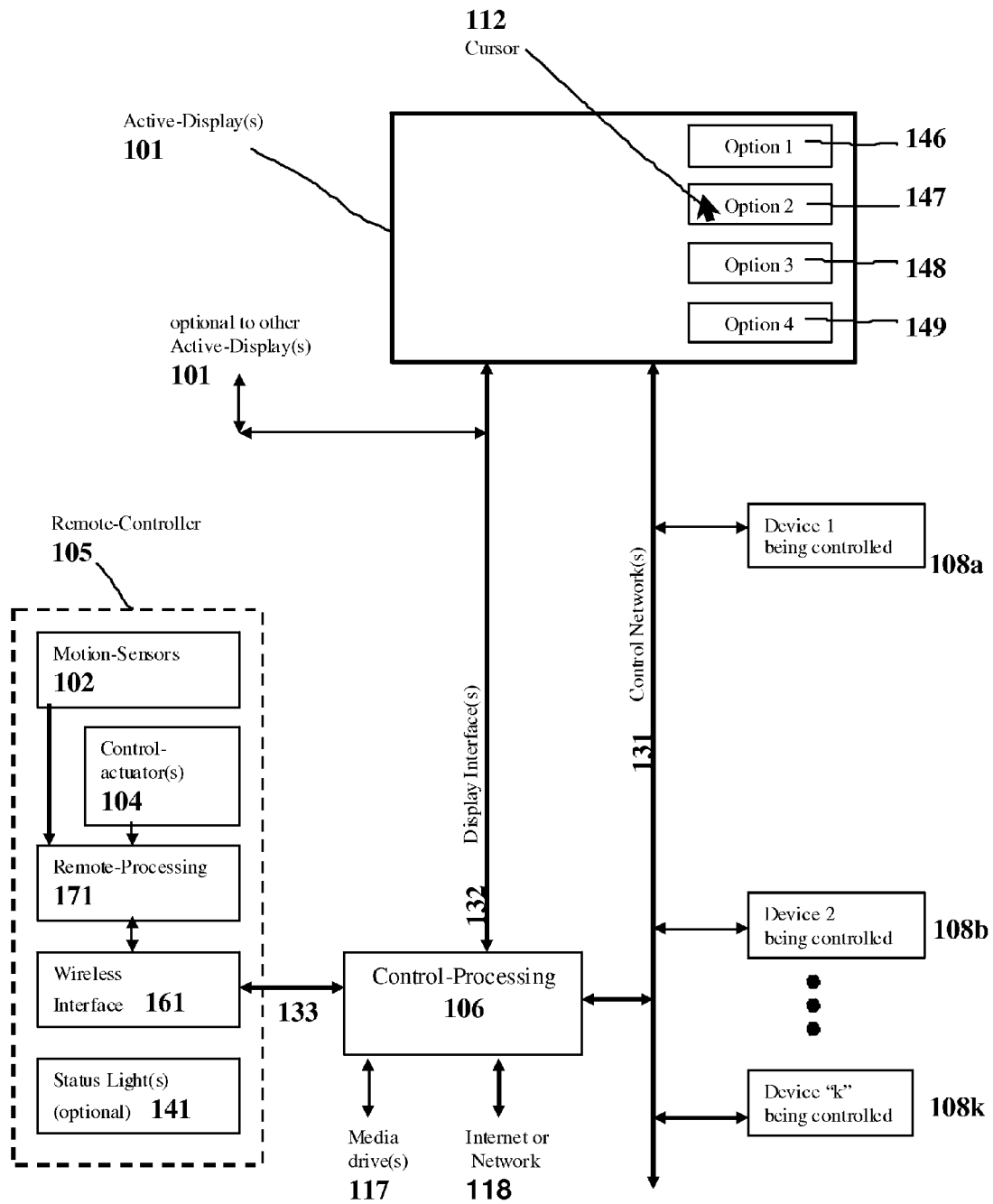

Fig. 7a

| Image ID | Selectable-object ID. | Control-action to take. | New image to display or modification of prior image. |
|---|---|---|---|
| Control-menu 5 | Volume-up | Increase volume by 1 increment. | Control-menu 5. |
| Control-menu 5 | Select Video Source. | none | Control menu 6 (select video source menu). |
| Control-menu 5 | Exit. (Remove menus) | none | Remove control-menu. Display video program. |

Fig. 7b

| Image ID | Location in Display-Region | Selectable-object ID. |
|---|---|---|
| Control-menu 5 | Rectangle: x1:y1 to x2:y1 x1:y2 to x2:y2 | Volume-up |
| Control menu 5 | Rectangle: x3:y3 to x4:y3 x3:y4 to x4:y4 | Select Video Source |
| Control-menu 5 | Rectangle: x5:y5 to x6:y5 x5:y6 to x6:y6 | Exit (Remove menus) |

Fig. 8
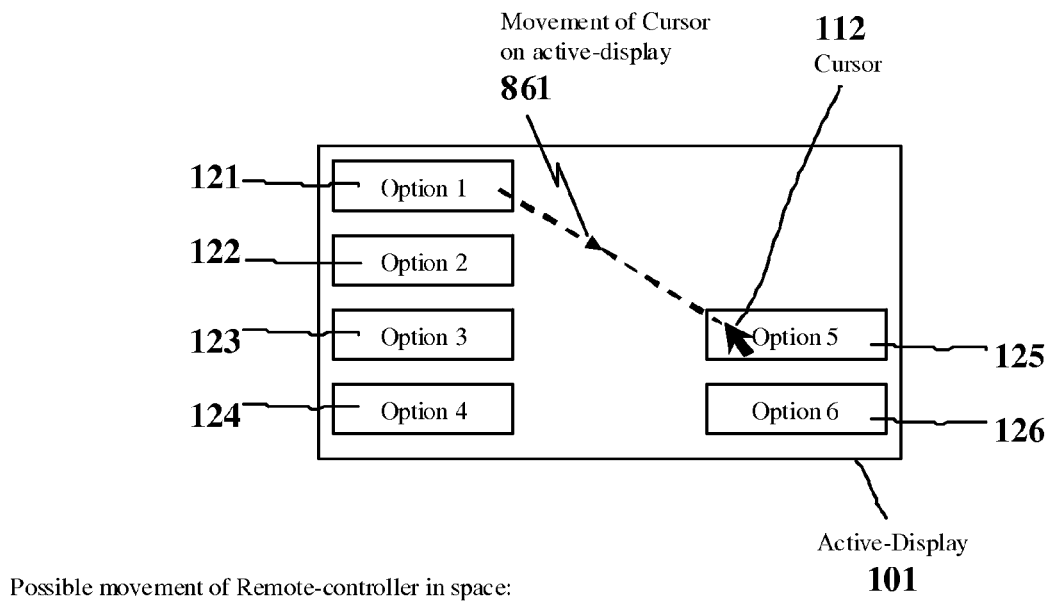
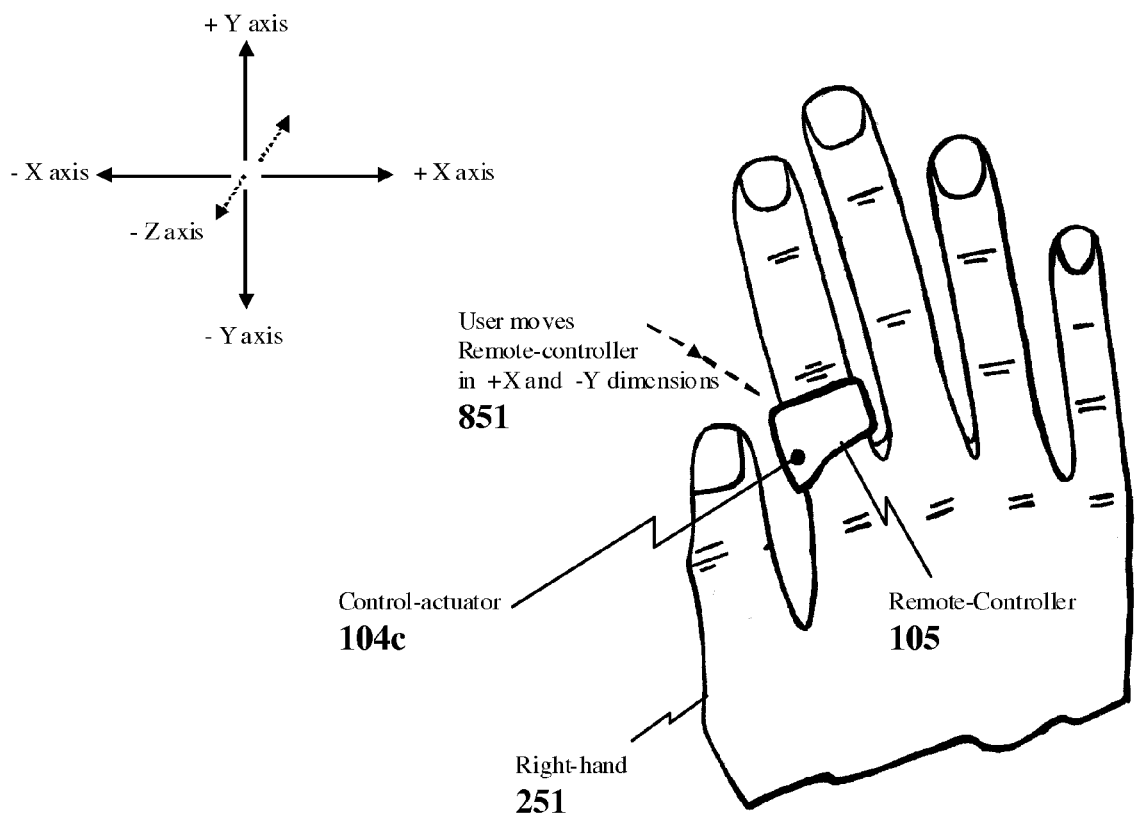

HANDHELD AND WEARABLE REMOTE-CONTROLLERS

RELATED APPLICATIONS

This application claims priority to Provisional Patent Application 61/332,186 filed on May 6, 2010, entitled "Handheld and Wearable Remote-Controllers". This earlier application, in its entirety, is incorporated by reference into this specification.

BACKGROUND OF INVENTION

1. Field of the Invention

This invention relates to the remote control of electronic-devices such as televisions; HDTV; home-entertainment-systems; home theatre systems; cable-boxes; satellite-TV equipment; media-centers; Digital Video Recorders (DVR); DVD-players/recorders; VCR's; media players; CD players; music players/systems; digital music devices; personal computers; computers; displays; appliances; lighting systems; sound systems; security systems; heating/cooling systems; video game systems; games; toys; or any other type of electronic device that user(s) may control or interact-with.

2. Description of Related Art

Current remote-controllers (i.e., remote-control or remote) are complex to use because of the large number of control-buttons they have. Two examples of prior art remote controllers are shown in FIG. 0a. Many prior art remotes have 40 to 65 or more physical buttons. The large number of buttons, present difficulties and are confusing for many users. Many users do not know what all the buttons do and are unable to use them. At any given time, only a portion of the buttons may be functional; but the presence of these non-functional buttons makes it more difficult for the user to find the button for the desired function.

A remote with a large number of buttons will tend to have smaller size buttons that are tightly packed and small size button-labels, which present additional difficulties for certain users (e.g., users with large fingers or farsighted vision). In addition, the small size buttons often result in text-abbreviations or small-icons that the user has difficulty seeing and/or deciphering their intended meaning. In addition, the user may be using the remote-control in a darkened room, where limited ambient light may make it difficult to see and/or find the desired buttons.

In addition, in many applications, the user is required to continually switch between looking "down" at the remote control buttons and looking "up" at the visual display to see if the intended action is occurring. In addition, switching between nearsighted tasks (e.g., looking at the control buttons) and farsighted tasks (e.g., looking up at a display) may present range of focus/correction problems (e.g., presbyopia) for certain users.

In addition, the user may need to press specific navigation buttons such as up; down; right; and/or left to move the selection-point (e.g., the action-point) on the screen. The user often needs to press the navigation buttons multiple times and in a particular order to arrive at a desired menu-item or selection. In addition, the user may need to alternately look up to the screen and back-down to the navigation and/or other control buttons multiple times; to check that the navigation movements or control actions are happening as expected and the intended navigation action is occurring.

In addition, some remotes utilize multi-button functional combinations (i.e., user must press multiple buttons at the same time) which further increase the user complexity. In addition, if the user presses the wrong button, the remote-control may enter a mode that the user doesn't know how to get out of or to accidentally make changes to the set-up configuration that the user may not know how to undo or must expend great effort to determine how to undo.

Each electronic device may come-with its own remote-controller. Often, a user may have multiple remote controls in a given user location (e.g., a separate remote for television; DVD-player; and music system). The user may need to press buttons on two or more remotes to cause the desired activity to occur. The various remote controllers may look confusingly similar to each other. The user may difficulty locating the remote controller needed to cause a desired control action. The button layouts may differ from one remote controller to another. In addition, the remote controllers take up limited space near (e.g., within reaching distance) of the user. Also, the user may temporarily misplace a remote controller(s).

What is desired is a simpler way of remotely controlling and/or interacting-with electronic-devices.

SUMMARY

Apparatus and method for the remote control and/or interaction-with electronic-devices such as televisions (TV); High Definition Televisions (HDTV); home-entertainment-systems; home theatre systems; cable-boxes; satellite-TV equipment; media-centers; Digital Video Recorders (DVR); DVD-players/recorders; Video cassette Recorders (VCR's); media players; Compact Disk (CD) players/systems; music players/systems; digital music devices; personal computers; computers; displays; appliances; lighting systems; sound systems; security systems; video game systems; games; toys; or any other type of electronic device that user(s) may control or interact-with.

An overview block diagram is shown in FIG. 1a. Motion sensors 102 are embedded in a remote-controller 105 that may be hand-held or attached-to a user (e.g., worn on a user's finger or hand). The motion sensors 102 may utilize any combination of micro-miniature sensors capable of being used to determine a lateral movement in two or three dimensions in space of the remote-controller 105. Examples of micro-miniature sensors include any suitable combination of micro-miniature accelerometers (e.g., sense acceleration in 1-dimension, 2-dimensions or 3-dimensions); rotation sensors (sense rotation in 1, 2 or 3 different axis); micro-miniature gyroscopes; inertial sensors; integrated micro-miniature inertial measurement units (IMUs); and other micro-miniature motion sensors known to those skilled in the art.

The remote-controller may include user control-actuator(s) 104 [e.g., push button switch(s)]. As shown in FIG. 1a, the remote-controller may include a wireless-interface 161 to communicate to control-processing 106. The information sent from the remote-controller 105 to the control-processing 106 may include: a) raw data or processed data from the motion sensors 102; and b) indicators of how/that the user has activated a control-actuator(s) 104.

In some embodiments, the remote-controller 105 may be activated (e.g., powered-up) when the user presses a control-actuator 104. When the remote-controller 105 is activated, an active-display(s) 101 (e.g., a control-display) may be activated (e.g., turned-on and/or light-up) and selection-menus (containing selectable-objects) along with a cursor 112 may be presented to the user on an active-display(s).

In some embodiments, to conserve power, the remote-controller 105 may automatically power-down, when the user has not activated a control-actuator for a defined period of time. In some embodiments, the control-menus and/or selection-menus may be automatically removed from the active-display(s) 101 when the user has not activated a control-actuator for a defined period of time.

Lateral movement of a remote-controller 105 in 2 dimensions (or 3 dimensions) in space, may cause the cursor 112 to move a corresponding related amount on a 2-D (or 2.5 or 3-D) active-display(s) 101. A user moves the remote-controller in-order to move the cursor 112 on/near a desired selectable-object that is shown on the active-display. When the user initiates a "select" (e.g., pushes a control-button on the remote-controller), a selected object may be determined from the location of the cursor 112. Corresponding to the user's selection(s), control action(s) may be performed on the device(s) 108 being controlled/interacted-with and additional selection-menus may be optionally presented on active-display(s).

In some embodiments, a single active-display 101 may act as the control-display and be used to control and/or interact-with a plurality of electronic-devices 108. In some embodiments, many electronic-devices 108 of many different types (even those that don't have an active-display), may all be easily controlled with only a single remote-controller 105 and only one active-display 101. In some embodiments, a dedicated active-display 101 may be used as the control-display. In other embodiments, the active-display 101 may be shared with other user-device functions. For example, a television-display may be temporarily used as an active-display 101 (e.g., the control-display).

In other embodiments, a plurality of active-displays 101 may be located near each other and used to control and/or interact-with a plurality of electronic-devices 108.

In other embodiments, a plurality of active-displays may be located in a plurality of dispersed locations [e.g., around a home or business] where each active-display may be used to control all or any subset of the devices. Another embodiment may also be used to control devices remotely across the Internet or other Wide-Area-Network (e.g., home devices may also be controlled from work or other locations).

Control-network(s) 131 may be used to forward control commands to affect the set-up; configuration or operation of a plurality of electronic devices 108a-108k. The control-network(s) 131 may be used to forward and to obtain status of a plurality of electronic devices 108. The control-network(s) 131 may include any combination of wired or wireless communication.

As an option, a plurality of user-devices that are to be controlled, may be added/removed by automatically detecting their attachment/removal on a network or communication-backbone via plug-and-play and/or standard device-discovery techniques.

Some objectives and/or advantages, only some of which may apply-to or be-realized in any one of the many disclosed embodiments, include:

Intuitively simple for a user to use.
Reduce the number of controls/buttons the user must push.
  In some embodiments, only one control button is needed.
Simplify user choices/selections to only those that are valid possibilities in the current context and will actually have an effect.
A single remote-controller may be used to control multiple devices and/or all of a user's devices.
May be implemented as a "universal" remote-controller.
Automatically adapt as devices are added/removed from a user's system.
Automatically adapt to the addition of new devices to a user's system including adding future electronic devices whose function and control needs are unknown at the present time.
Simplify user set-up and configuration.
Eliminate the need for navigation buttons such as up; down; left; right.
Reduce the need for the user to look-down at the controller to find the correct button to push and then back up to the display to see if it happened.
Work with any type of active-display.
May be optionally implemented to be backwardly compatible with older electronic-devices that are controllable via infrared control-codes.

BRIEF DESCRIPTION OF DRAWINGS

FIG. 0a shows examples of prior art remote-controllers.

FIG. 1a illustrates a functional block diagram for one embodiment.

FIG. 7a shows a simplified example of a table that may be used to predefine what actions are to be taken, when selectable-objects are selected in each display-image.

FIG. 7b shows a simplified example of a table that is used to define the location of each selectable-object in a display-region or control-menu.

FIG. 8 illustrates a simplified example of how user movement of the remote-controller in space causes a corresponding movement of the cursor on an active-display.

DETAIL DESCRIPTION

An apparatus and method for the remote control and/or interaction-with one or more electronic-devices such as televisions; home-entertainment-systems; media-centers; DVD-players; VCR-players; media players; music systems; personal computers; computers; displays; appliances; lighting systems; security systems; games/toys; electronic-displays or any other type of electronic device that user(s) may control or interact-with. A remote-controller that contains motion sensors (e.g., accelerometers; inertial sensors; MEMS sensors) may be held-by or worn-by a user. When the remote-control mode is activated, selection-menus (containing selectable-objects) along with a cursor (or point-of-action) may be presented to the user on an active-display(s). When the remote-controller is moved in one or more dimensions in space, a cursor or point-of-action is moved by a related amount on the active-display. A user may move the remote-controller in-order to position a cursor or point-of-action, on or near a desired selectable-object that is shown on a menu on the active-display. When the user initiates a "select" (e.g., pushes a control-button on the remote-controller), the object the user selected is determined. Corresponding to the user's selection(s); control action(s) may be performed on the device(s) being controlled/interacted-with and additional selection-menus may be optionally presented on active-display(s). A single remote-controller is able to control multiple electronic devices. In one embodiment, a remote-controller has a single button and is able to control a plurality of electronic-devices.

Figure 4A:
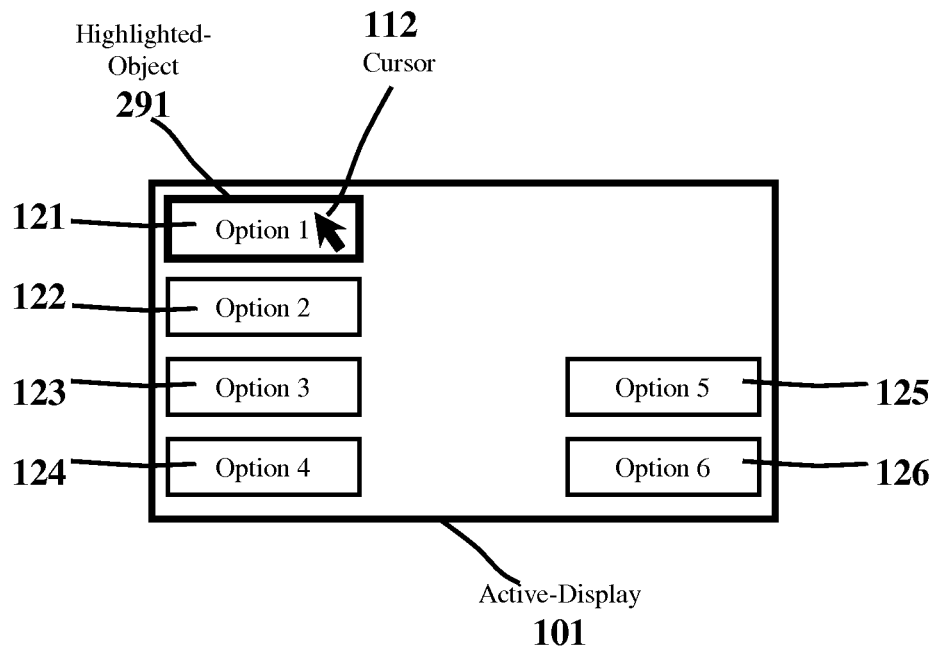
FIG. 4a illustrates examples of selectable-objects on an active-display that a user may select using the cursor.
Figure 4B:
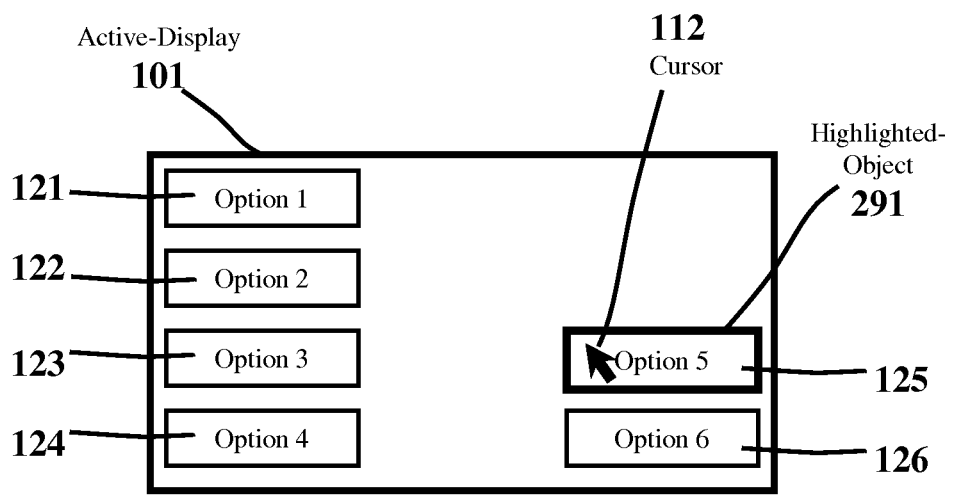
FIG. 4b illustrates examples of selectable-objects on an active-display that a user may select using the cursor.

Simple Operational Example:

A simple operational example is shown in FIG. 8. Assume that the cursor 112 was initially positioned over "option 1" on the active-display 101 (as shown in FIG. 4a). When the user moves the remote-controller 105 in the "X" and "Y" dimensions in space (851), there is a corresponding movement (861) of the cursor 112 on the active-display 105. As shown in the example of FIG. 8, as the user moves the remote-controller 105 in the +X and −Y dimensions in space (851), the cursor 112 moves from being on "option 1" to being on "option 5". After the user has completed this described movement of the remote-controller 105, the active display 105 may then appear as shown in FIG. 4b. Once the cursor 112 is on "option 5", the user may then use their thumb to press the control-actuator 104c to "select" that option ("option 5").

Functional Overview: Simplified Example:

FIG. 1a illustrates a functional block diagram of one embodiment. As shown in FIG. 1a, the remote-controller 105 may include motion-sensors 102, one or more control-actuators, remote-processing 171, wireless interface 161, and optional status light(s) 141.

Motion-sensor(s) 102 [e.g., movement sensors, accelerometers; inertial sensors; initial measurement units] may be embedded in a remote-controller 105. The motion-sensors 102 may detect the amount of 2D or 3D movement of the remote-controller 105.

The user may move the remote-controller 105 in one or more dimensions in-order to cause the cursor 112 (or action-point) to move on an active-display(s) 101 in-order to select and/or interact-with objects on the active-display(s) 101.

In some embodiments, the remote-controller 105 may be held in a user's hand (handheld). In other embodiments, the remote-controller 105 may mount/attach to a user's finger(s) or hand. For example, in some embodiments, the remote-controller 105 may be configured to be easily positioned onto (and removed from) a user's finger(s) or hand.

In one embodiment, the remote-controller 105 may be a ring-apparatus that may be slid onto a user's finger (e.g., the user's right-hand or left-hand index finger) includes motion sensors that may detect the amount of 2D or 3D movement of the ring-apparatus. In some embodiments, the remote-controller 105 may have only a single control-actuator (e.g., a pushbutton), so that a remote-controller 105 is very simple and intuitive to use (as there is only a single button to push).

In some embodiments, the user may press control-actuator(s) 104 to power-up/activate the remote-controller 105 and to cause the control-processing 106 to display selection-menus and a cursor 112; on one or more active-display(s) 101. When the user moves the remote-controller 105, the cursor 112 may be moved on the active-display(s) 101 by an amount that corresponds to the amount that the user moved the remote-controller 105 in 2D or 3D space. By moving the remote-controller 105 in 2D or 3D space, the user may cause the cursor 112 to be moved on/near selectable objects. The user may then use the control-actuator(s) 104 to select (e.g., to click-on) an object the cursor is on/near in the active-display 101. Based upon the selection made, the control-processing 106 may send control-commands to the device(s) being controlled 108 and/or other menu-selections may be presented (to the user) on the active-display(s) 101.

A user may move the remote-controller (in 2 or 3 dimensions) to cause the cursor 112 to move on the active-display(s) 101. The cursor 112 may be placed on/near selectable-object(s) present on an active-display(s). When the user initiates a "select" (e.g, a "click"), the processor captures the location of the cursor 112 in the active-display 101. The cursor 112 location at the time of a "click"; may be used to determine which object(s) the user selected [e.g., the object(s) the user was "pointing" at]. The desired-action(s) that correspond to the user's selection(s) may be performed on the device(s) being controlled 108 and/or other actions taken that correspond with the user's intention and/or other display-selection/menus may be presented to the user on the active-display(s) 101.

One embodiment may be used as a remote-control for one or more electronic-devices (e.g., televisions; DVD-players; music-systems; appliances). Some embodiments may also be used as a computer-mouse or pointing-device, in-order to interact with objects on an active-display (such as a computer). Some alternative embodiments may function similar to a computer-mouse or other pointing-device. Some optional embodiments may also be made inter-operable with existing electronic-devices [e.g., televisions] that are controlled with infrared signaling.

Based upon operational context, the control-processing 106 may place control-menus and/or selection-options on an active-display 101, that the user may select and/or interact with. The control-menus and/or selection-options may be used to control one or more devices that are being controlled 108a-108k [e.g., electronic-devices and/or user-devices]. In the example shown in FIG. 1, four objects ["option 1" 146; "option 2" 147; "option 3" 148; and "option 4" 149] may be [temporarily] displayed on the active-display 101 and represent options that the user may optionally select from.

To select an option, the user may press a control-actuator(s) 104 to activate a selection-menu; and then orient the remote-controller 105 to move the cursor 112 on [or near] one of the objects. The user may initiate a "select" by activating (e.g., pressing) a user-control-actuator(s) 104. In one embodiment, the user-control-actuator(s) 104 may include control-actuator(s) 104 such as one or more mechanical switches that the user may press. For example, in one particular embodiment, a single switch/button may act as a very simple user-control-actuator(s) 104. The activation of a control-actuator 104 (e.g., pressing to do a "selection"), may be communicated 133 to the control-processing 106.

When the "select" is activated, the control-processing 106 may capture the location of the cursor 112 or active-point at the time at which the "select" was activated. Using the captured cursor 112 location, the processing may then determine which selectable-object [e.g., menu-option] the user "selected". The control-processing 106 may determine the control-commands that need to be issued the appropriate device(s) 108a-108k in-order to perform the control-action(s) that correspond to the user's "selection". The control-commands may be communicated to the device(s)-being-controlled 108. Depending on the application and context, the processing may then cause a new set of menu-options or selectable-object(s) or entertainment programming to be displayed to the user on the active-display 101.

In some embodiments, media drive(s) 117 (e.g., a DVD or CD) and/or Internet/Network 118 interface may be optionally attached to the control-processing 106; in-order to provide [one-time] set-up and/or configuration-data and/or other information useful for controlling and interacting with various electronic-devices 108.

In general, the user may select and/or interact with objects that are on active-display(s) 101.

In general, the user may use the remote-controller 105 to control any type of electronic device. A single controller may also be used to control a plurality of devices 108a-108k and/or interact with one or more active-displays 101. The remote-controller may be used to drag; pull and/or interact-with objects across multiple active-displays 101 and take actions on one screen that affect another screen.

In many embodiments, no surface or working area is needed to operate the remote-controller 105; even when performing the functions equivalent to those of a computer-mouse. This allows the user to easily orient the remote-controller from any position, including standing; sitting; reclining; lying on a couch; etc.

Figure 1B:
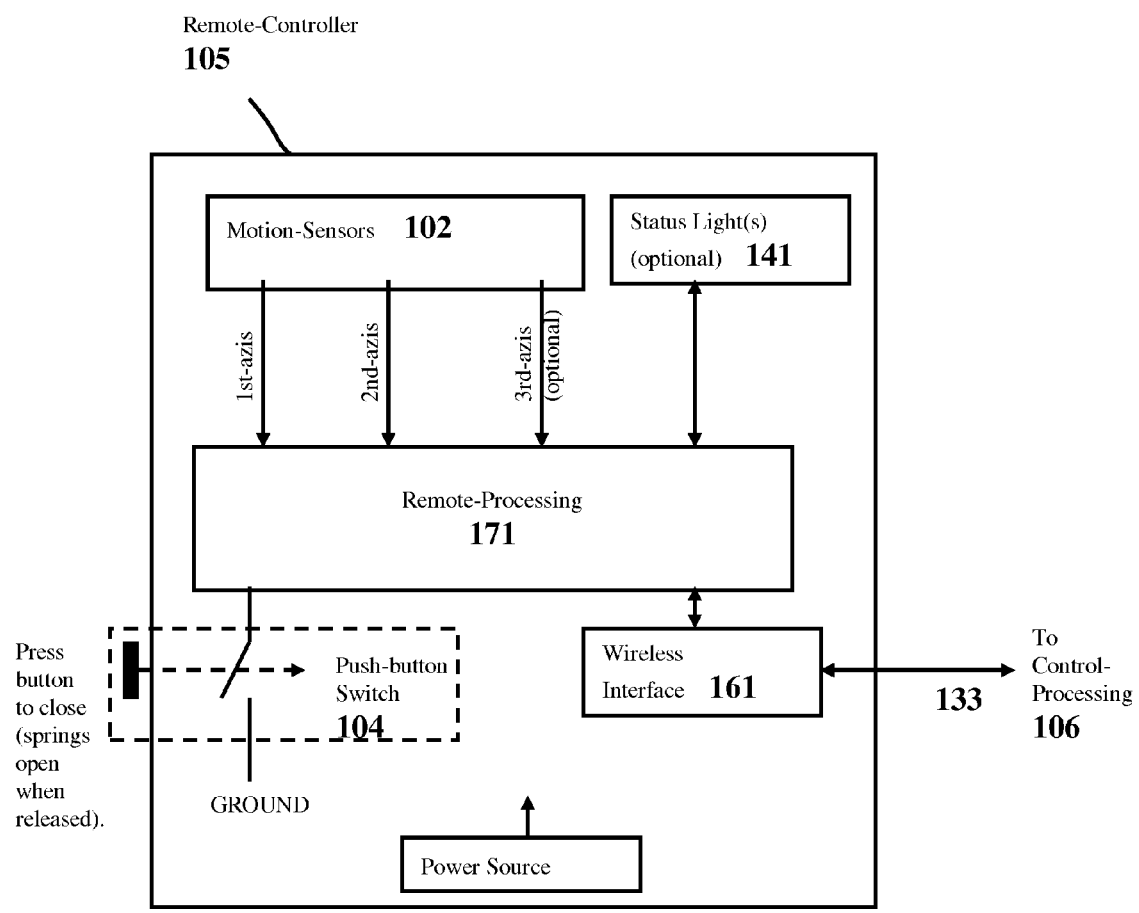
FIG. 1b illustrates one embodiment of a block diagram of the remote-controller 105.

Remote-Controller Functionality:

As shown in FIG. 1a and FIG. 1b, the remote-controller 105 may include motion-sensors 102; user-control-actuator(s) 104; remote-processing 171; and a wireless interface 161. The wireless interface 161 allows communication 133 with the control-processing 106.

As an option, the remote controller may also contain one or more status lights 141. For example, the remote controller may contain an "on/working" or "working/active" light (e.g., an LED) in-order to indicate to a user that the unit is: powered-on; functioning normally; and/or properly communicating with control-processing 106. To conserve power, the optional "on/working" light may light-up or may flash, only when the remote-controller 105 is being activated by the user and communication is verified as properly occurring with the control-processing 106. In one embodiment, when the user actuates a control-actuator 104, the status light 141 may flash "on" to indicate to the user that command/control information has been sent by the remote-controller 105 to the control-processing 106 and that the remote-controller 105 has received back from the control-processing 106 a communication that the commands were successfully executed.

The remote controller 105 may also contain a power source. The remote-controller 105 may be configured to minimize power consumption in-order to allow the use of smaller size batteries and/or provide a longer time between battery replacement/recharge. For example, the remote-controller 105 may automatically enter a reduced/lower power state when no user activity is detected for a defined time-period.

Motion-Sensors:

The motion sensors 102 may utilize any combination of micro-miniature sensors capable of being used to determine a lateral movement in two or three dimensions in space of the remote-controller 105. Examples of micro-miniature sensors include any suitable combination of micro-miniature accelerometers (e.g., sense acceleration in 1-dimension, 2-dimensions or 3-dimensions); rotation sensors (sense rotation in 1, 2 or 3 different axis); micro-miniature gyroscopes; inertial sensors; integrated micro-miniature inertial measurement units (IMUs); and other micro-miniature motion sensors known to those skilled in the art. Micro-miniature and integrated-circuit versions of these types of sensors are available off-the-shelf from many different vendors.

Some of the major selection factors for the motion sensors 102 include 1) the type of motion sensing and the sensing-ranges; 2) a small package size and 3) low power dissipation (for battery powered remote-controller 105 embodiments).

To minimize size, weight and power, the MEMS (Micro Electro Mechanical Systems) sensors may be included in semiconductor micro-chips and integrated circuits (e.g., as miniaturized electronic circuitry; digital circuitry). Those skilled in the art know of many different types of sensors suitable for use in detecting motion. Some examples of MEMS sensors include piezoelectric effect; capacitive changes from structure displacement; mass displacement of suspended structures; and many others. For example, the company "Analog Devices Inc" offers iMEMS® inertial sensing components including accelerometers and gyroscopes, and iSensor® intelligent sensors, including integrated inertial measurement units (IMUs). For example, Analog Devices Inc offers MEMS-based accelerometers in 1-, 2- and 3-axis configurations, with analog or digital output, in low-g or high-g sensing ranges.

In some of the disclosed embodiments, either a 2 or 3 axis accelerometers may be used. Depending on the embodiment, the accelerometers may be selected with a +/−2 g to +/−6 g sensing range (where "g"=the acceleration force of gravity). Larger "g-force" sensing ranges are also available from the vendors. Off-the-shelf integrated circuits are available from multiple vendors that are able to sense lateral (directional) movement in either 1-dimension, 2-dimensions or 3-dimensions. Depending on the embodiment, potential suppliers of motion sensors include Analog Devices Inc; Freescale Semiconductor; STMicroelectronics and other companies that are known and/or locatable by those skilled in the art. Some examples of micro-miniature integrated circuit accelerometers include the Analog Devices Inc family of iMEMS accelerometers. One examples are the Analog Devices Inc ADXL335 (3-axis) and ADXL345 accelerometers. Another example is the Freescale Semiconductor part number MMA7260QXYZ which is a 3-axis low-g acceleration sensor.

Analog Devices Inc Inertial Measurement Units (IMUs) are based on ADI's iSensor intelligent sensor accelerometers and gyroscopes. Analog Devices Inc IMUs offer highly integrated devices that sense motion including the type, rate, and direction of that motion across multiple axis. By using the combined input from multiple accelerometer and gyroscope inertial sensing devices, IMUs are able to measure multiple degrees of freedom (DoF) using a single component. For example, the Analog Devices ADIS 16362 is a six-degrees-of-freedom inertial sensor.

Processing the Motion Sensor Data:

As known in classical physics, sensed acceleration may be mathematically integrated (e.g., calculus) to obtain velocity. And the velocity may be mathematically integrated (e.g., calculus) to obtain position (e.g., location). Similarly, a change in position (e.g., change in location) may be determined. The force of the earth's gravity ("1 g") may be considered in the calculations. Rotations of the remote-controller 105 by the user that cause changes to the force of the earth's gravity being varyingly sensed by the accelerometers in multiple axes may need to be factored into the calculations, in-order to recognize the difference between lateral movements and rotation of the remote-controller 105. In some embodiments, micro-miniature inertial measurement units (IMUs); or a combination of both accelerometers and rotational sensors may be used, to more easily determine/calculate lateral movement from rotation of the remote-controller 105.

Mathematical integration may be performed in any combination of the analog and/or digital processing domains. For example, a capacitor may be used to perform integration in the analog domain. Alternatively in some embodiments, methods, which are known to those skilled in the art, of performing integration in the digital domain on a set of discrete time samples or sampled digital data (e.g., after analog-to-digital conversion) may be used. In some embodiment, this integration processing may be performed in the remote-processing 171. Alternatively, some portion this of this processing may be performed by the control-processing 106.

Those skilled in the prior art will have knowledge of the following patents: U.S. Pat. No. 4,839,838 (LaBiche); U.S. Pat. No. 5,181,181 (Glynn); U.S. Pat. No. 7,239,301 (Liberty); U.S. Pat. No. 7,262,760 (Liberty); U.S. Pat. No. 5,703,623 (Hall) all of which are incorporated by reference herein.

Reducing Remote-Controller Size & Cost:

In some embodiments, all of the motion-sensor(s) 104 may be incorporated into a single integrated circuit. In addition, the motion-sensor(s) 102 may be incorporated into the same integrated along with any of the other remote functions such as the remote-processing 171 and/or the wireless interface 161 and/or the connections to the control-actuator(s) 104. Integrating the remote-controller 105 functions onto fewer or a single integrated circuit may help reduce the assembly cost, the power consumption, and/or the size of the remote-controller 105. In one embodiment, the motion-sensor(s) 102; the remote-processing 171; the wireless interface 161; and the connections to the control-actuator(s) 104 may be incorporated into a single integrated circuit.

Examples of Physical Embodiments of the Remote-Controller:

The remote-controller 105 may be configured so that a user may easily move the remote-controller 105 through one, two or three dimensions of space. In some embodiments, the remote-controller 105 may be packaged so it may be held in a user's hand and may be easily moved by the user in one or more dimensions in space. In other embodiments, the remote-controller 105 may be configured so as to be worn by the user (e.g., in a user's hand or finger) to allow easy movement in one or more dimensions in space, even while the user's torso remains at rest.

Figure 2A:
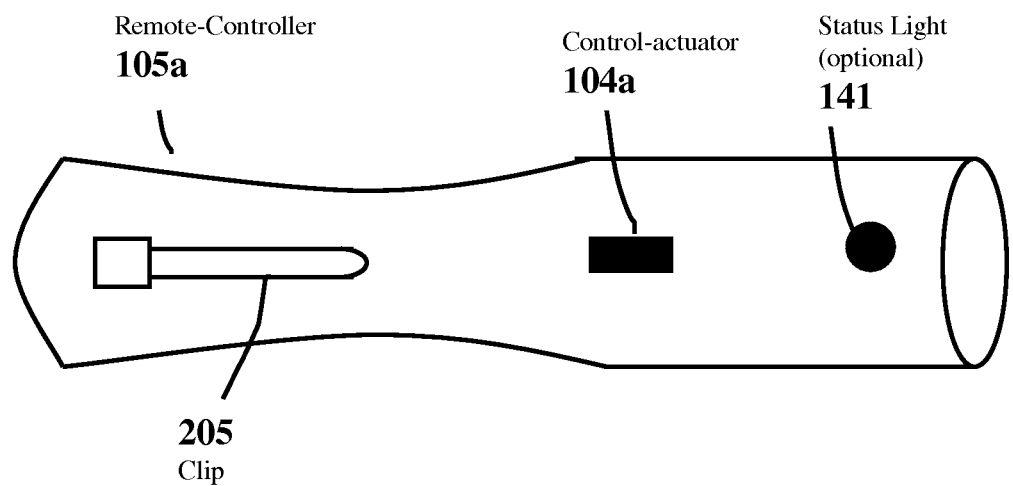
FIG. 2a illustrates an embodiment of a hand-held remote-controller with a circular-cross-section or elliptical-cross-section.

In the physical embodiment shown in FIG. 2a, the remote-controller 105a may have an approximately cylindrical-type shape, similar to a pen or pencil. The remote-controllers cross-section may be configured so that the control-actuator(s) 104a are naturally aligned with the users thumb when held in the user's hand. The control-actuator(s) 104a may be mechanical-type switch(es) or button(s) that the user may easily press with the thumb of the hand that is holding the remote-controller. The remote-controller's cross-section may be variable along its length and/or along its circumference in-order to fit comfortably in the user's hand and to naturally align the user's thumb with the control-actuator(s). In some embodiments, the functions of the remote controller 105, may be integrated into a actual working pen or pencil. As an option, the remote-controller of FIG. 2a may also contain a clip 205; that allows the remote-controller, when not in use, to be clipped onto a shirt pocket or other objects. The clip may also act to prevent the remote-controller from rolling when placed on a flat surface.

Figure 2B:
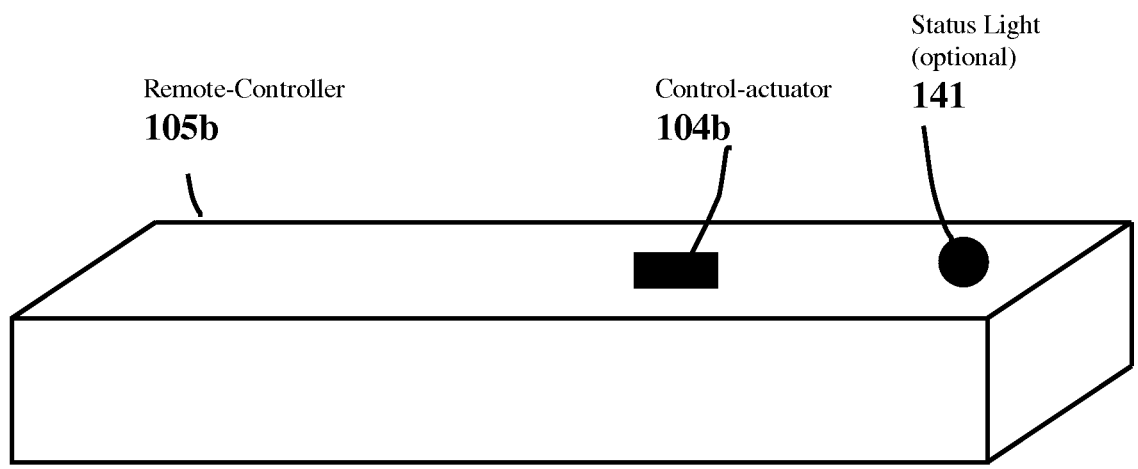
FIG. 2b illustrates an embodiment of a hand-held remote-controller with a rectangular-shape or rectangular-cross-section.

In another physical embodiment, shown in FIG. 2b, the remote-controller 105b may have a square or rectangular cross-section [e.g., similar in shape to remote-controllers currently used for televisions; DVD-players; music-systems; etc]. In one embodiment, the control-actuator(s) 104b may be easily and naturally reached by the thumb of the same hand that is holding the remote-controller 105b.

The shape of the remote-controller 105b may be sculpted along its length or width to naturally align the user's thumb with the control-actuator(s) [e.g., 104a or 104b] when a user is holding the remote-controller (such as 105a or 105b). One advantage of these embodiments is that the remote-controller 105 may be operated with only a single hand. Whereas some prior art remote-controllers may require one hand to hold and orient the remote-controller while fingers from the user's other hand are used to push the desired button(s).

In some embodiments, the remote-controller 105 may be worn on one hand of the user while the user is able to operate the control-actuators 104 using the thumb of the same hand. FIG. 2c through FIG. 2h show several examples of different physical embodiments of remote-controllers 105 that may be worn on a user's hand. Physical embodiments of the hand wearable remote controllers 105 may be configured to slide on and off of one-finger (FIG. 2c); two fingers (FIG. 2e); three fingers; and/or four fingers (FIG. 2f). The choice of the physical configuration may be based upon on the cost of various sizes and shapes of the many possible configurations of remote-controllers 105. More expensive remote-controllers may be packaged in a smaller size packaging. In addition, the cost of producing a given size remote-controller 105 packaging is expected to decrease over time. In addition, users may have a preference for different shapes and sizes of a remote-controller 105 based upon a) ease of attaching or removing the remote-controller 105 from the user's hand b) comfort when wearing c) ability to do other activities while wearing the remote-controller 105 and/or d) many other user factors. For example, a user may want to be able to type on a keyboard or write with a pen/pencil while the user is wearing a remote-controller 105c-105h.

Note that in some multi-finger embodiments, the remote-controller 105 may have a single opening that can accommodate a plurality of fingers. In alternative multi-finger embodiments, the remote-controller 105 may have a plurality of openings to accommodate individual fingers (similar to how a glove has an opening for individual fingers). In other multi-finger embodiments, the remote-controller 105 may be incorporated into a glove or mitten configurations. In some glove/mitten embodiments, the finger ends of the glove may be left open (similar to bicycling gloves) so the bare fingers are exposed; and the fingers are accessible to handle and touch objects.

A wearable remote-controller 105 may have one, two, three or more control-actuators 104 such as push-buttons; switches, etc. FIGS. 2c, 2d, 2e, and 2f show a few examples of a remote-controller 105 with only a single control-actuator 104 (e.g., a single push-button switch) which is reachable by a user's thumb. FIG. 2g shows an example of an embodiment of a wearable index-finger-ring remote-controller 105g that has two control-actuators 104g (e.g., two push-buttons switches) which are both reachable by a user's thumb. FIG. 2h shows an example of an embodiment of a wearable index-finger-ring remote-controller 105h that has two control-actuators 104h (e.g., two push-buttons switches) which are both reachable by a user's thumb.

Figure 2C:
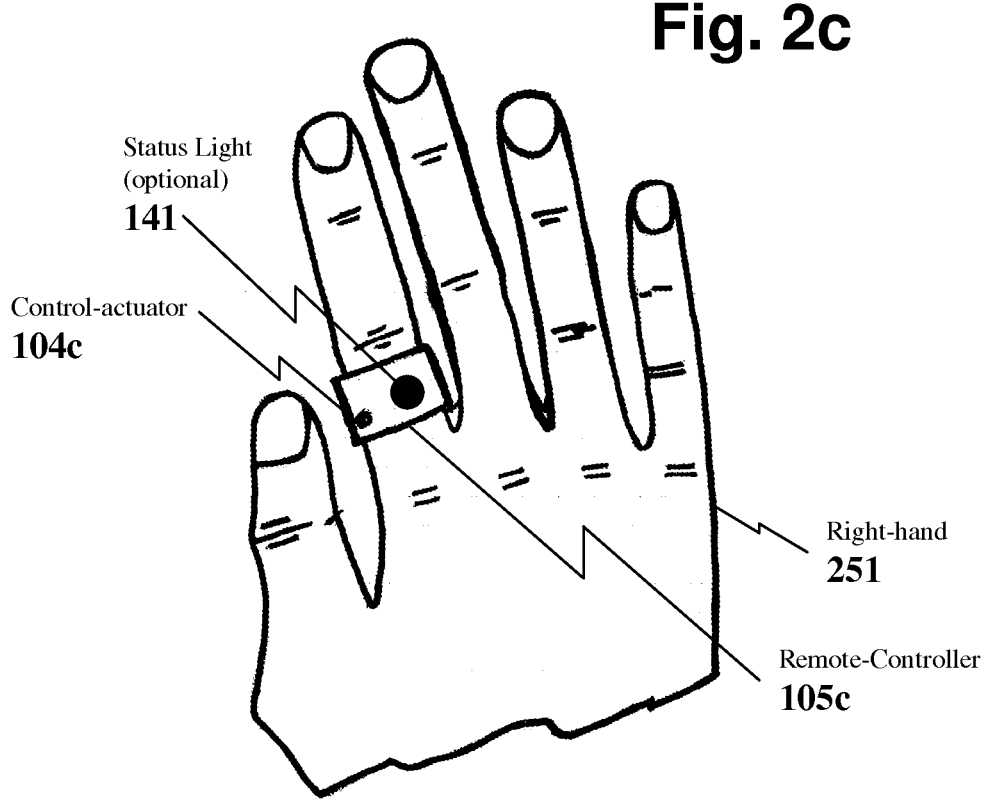
FIG. 2c illustrates an embodiment of a wearable remote-controller that may be worn on a user's index finger.
Figure 2D:
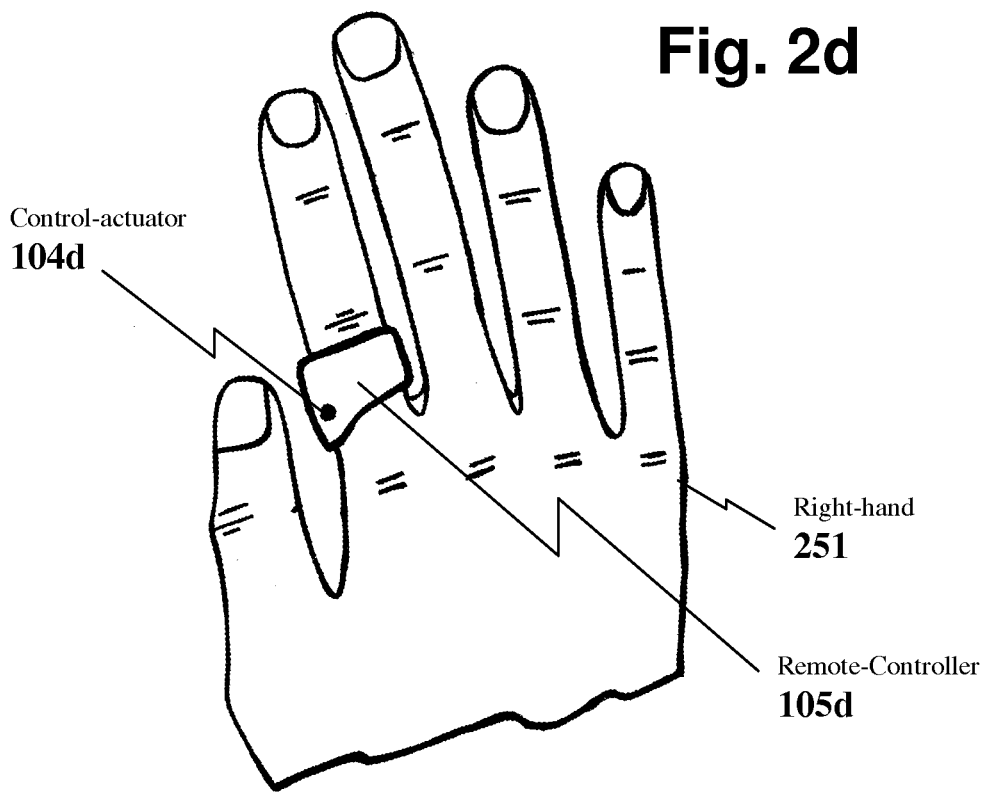
FIG. 2d illustrates another embodiment of a wearable remote-controller that may be worn on a user's index finger.
Figure 2E:
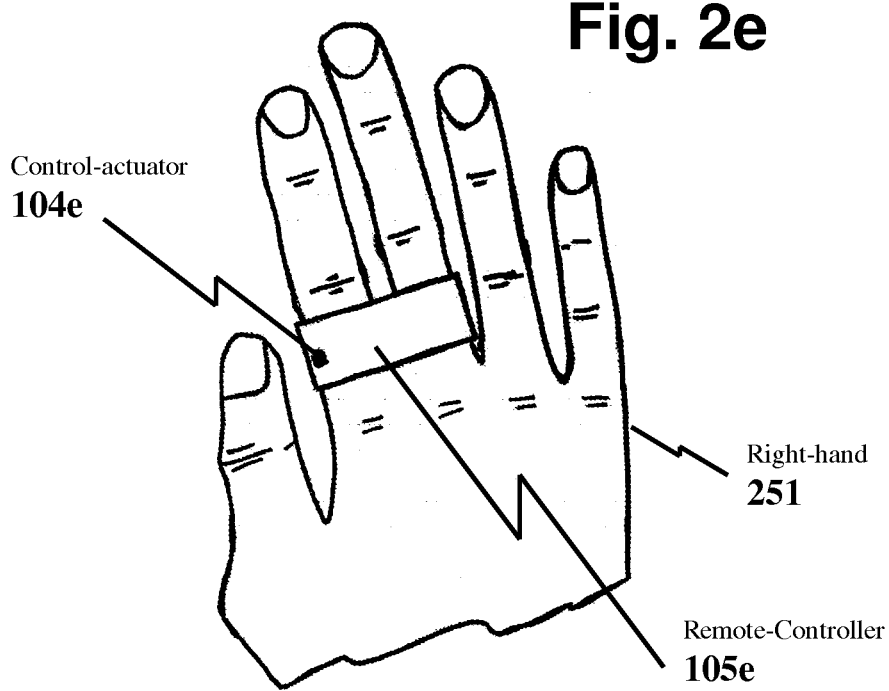
FIG. 2e illustrates an embodiment of a wearable remote-controller that may be worn on two fingers.
Figure 2F:
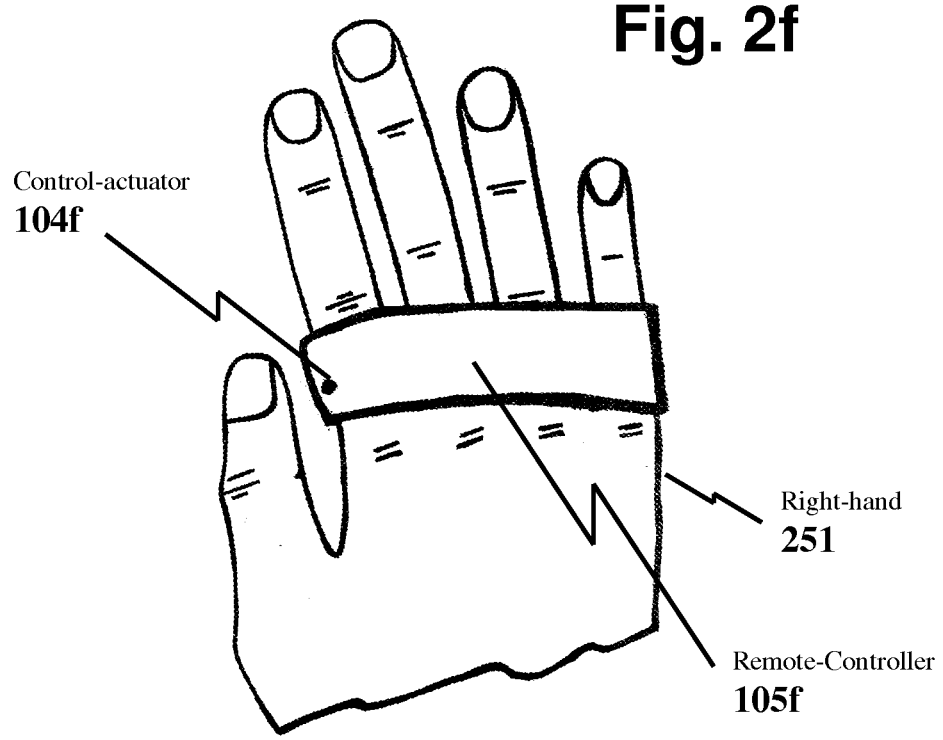
FIG. 2f illustrates an embodiment of a wearable remote-controller that may be worn on a user's hand.
Figure 2G:
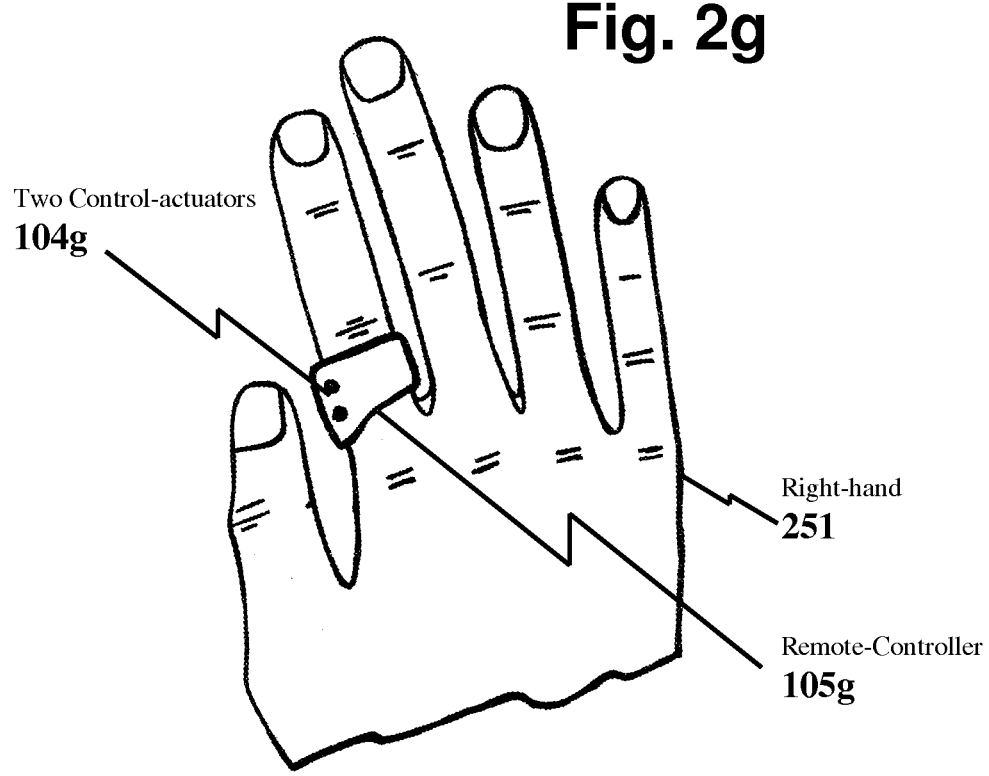
FIG. 2g illustrates an embodiment of a wearable remote-controller with 2 control-actuators that may be worn on a user's index finger.
Figure 2H:
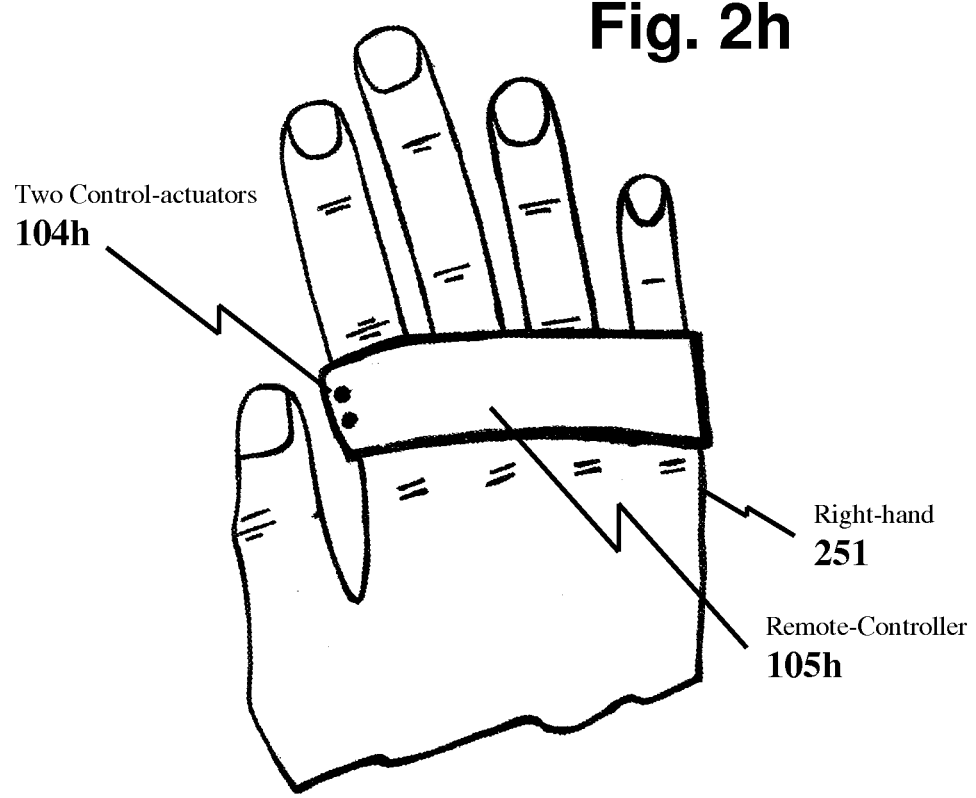
FIG. 2h illustrates an embodiment of a wearable remote-controller with 2 control-actuators that may be worn on a user's hand.

In the physical embodiment shown in FIG. 2c, the remote-controller 105c may be shaped similar to a ring that may be worn on an index finger of a user. If the remote-controller shown in FIG. 2c is worn on the right-hand index finger then the right-hand's thumb (of the same hand that is wearing the ring) may easily activate the control-actuator(s) 104c. The remote-controller 105c may be ring-shaped with an appropriate size hole or an adjustable size hole, for sliding on/off a user's finger.

The size of the remote-controller opening may be made adjustable and able to comfortably fit to a wide range of sizes needed by different size people. For example, the finger size of the ring remote-controller (102c-102d) opening may be made adjustable and able to comfortably fit to a wide range of sizes needed by different size people. In one physical embodiment, the size of the ring opening may be made adjustable for different size users by use of an elastic-band whose loop length is adjustable. As another embodiment, the size of the ring opening may be made adjustable with attachable/detachable Velcro-type strips used for part of the ring's circumference. In other embodiments, combinations of elastic strips and Velcro-type strips may be used for parts of the ring's circumference or loop. In some embodiments, the loop may be made adjustable over an even larger range so that the remote-controller 105 may be adjusted by the user to fit over one; two; three and/or four fingers of the user, so that each user may chose their most comfortable configuration of wear the remote-controller 105. In some embodiments, once the loop length or circumference has been adjusted to a user, that adjustment/opening size may be maintain even when the user removes and/or re-installs the remote-controller 105 on their hand.

One advantage of such wearable remote-controllers 105c-105h is that the remote-control 105 remains readily available between uses. Unlike prior-art handheld remote-controllers, the user does not need to set the remote-controller aside after completing the desired control operating and then, at a later time, go hunting around to re-locating the remote-controller in-order to change controls.

In some embodiments, the shape of a wearable remote-controller 105 may be configured to allow the control-actuator(s) 104 to be naturally aligned with the thumb of the user. For example, in the embodiment shown in FIG. 2d, the shape of the remote-controller may be varied for a natural alignment of the thumb with the location(s) of the control-actuator(s). The location of the actuator(s) on the remote-controller 105 may be chosen so as to minimize the user accidentally activating the control-actuators 104 when not intended by the user.

The shape of the remote-controller 105 may also be configured with gripping points for the fingers of the other hand (e.g., non-wearing hand), to allow a user to more easily slide the remote-controller 105 both on and off the user's wearing hand.

In some embodiments, the shaped remote-controller 105 may be configured, so that the same remote-controller 105 may be worn on either the right-hand or left-hand of a user, while still allowing the control-actuator 104 is easily accessible by the thumb of the hand the remote-controller is being worn on. That is, the same remote-controller 105 may be worn and easily operated when on either a user's right-hand or left-hand. In other embodiments, specialized configurations may be employed that are intended for only the right-hand or only the left hand of a user.

As an option, a ring and/or hand-wearable configuration may also contain any of various types of jewelry-type decorations and/or ornamentations, beyond that which is required for functionality.

In even other embodiments, the functions of a remote-controller 105 may be added into many other existing devices. For example, the remote-controller 105 functions [102, 104, 171, 161] may be incorporated into a pen; pencil; standard laser-pointer; cell-phone; personal digital assistant (PDA); or any other (mobile) device.

In other optional alternative embodiments, the elements [102, 104, 171, 161] of a disclosed remote-controller 105 embodiments may be shared with other elements/capabilities that are normally included in other user-devices. For example, the motion-sensors 102 may be incorporated into a cell-phone or a personal digital assistant (PDA) or other mobile device and also be used for other functions beside just remote-controlling. The remote-processing 171 and wireless interface 161 may also be shared with other functions that may be included in these multi-function devices.

In other optional alternative embodiments, the remote-controller 105 functions [102, 104, 171, 161] may be incorporated into any type of prior-art remote controllers. For example, the remote-controller functions may be also incorporated into a prior art infrared-universal-remote-controller such as those that are similar to those show FIG. 0. In some embodiments, this may ease the transition from prior-art infrared-remote-controllers, since a user may either continue to operate the old way (by press the many buttons on the remote) or use one button of the presently disclosed embodiments.

Control-Actuator(s):

In general, the user may interact with the control-processing 106 by activating one or more control-actuator(s) 104 which may be physically packaged with the remote-controller 105. Depending on the embodiment, the user control-actuator(s) 104 may utilize physical-controls such as push-buttons-switches; switches; etc.

In some embodiments, only a single "select" switch/button (e.g., 104a, 104b, 104c) may be used as the control-actuator 104. Only a single switch/button may be needed in applications where the user only needs to select options/objects from a menu. Some example applications include where only a single switch (e.g., a single push button switch) may be needed include the control of: televisions; DVD-players; cable-boxes; Digital-Video-Recorders (DVR's); home-theater-systems; music-systems; appliances; security systems; heating/cooling systems; thermostat; lights (on/off; dimming); window shades; etc.

FIGS. 2a and 2b provide examples of the use of control-actuator(s) 104a-104c in hand-held remote-controllers 105. FIGS. 2c through FIG. 2h, show examples of control-actuator(s) 104c used in a wearable remote-controller 105. The control-actuator(s) 104 may be positioned on the remote-controller 105 so that they may be activated using the thumb of the same hand that is holding or wearing the remote-controller 105.

In one embodiment illustrated in FIG. 1b, the remote-controller 105 may have a single control-actuator 104 that only has two positions: a "no action position" and a "pressed" position. In this embodiment, the actuator acts as a simple switch or push-button-switch with two positions. The switch will automatically return-to the "no action position" whenever the user is not pressing on the switch. For example, a springy-material may be used to return the actuator the "no action position" whenever the user releases (e.g., is not pressing the actuator). When the user temporarily presses the switch into the second position, a "select" occurs which is communicated to the control-processing 106. In this embodiment, when there is no menu on the active display 101, the control-processing 106 may cause a selection-menu to be initially placed on the active-display 101, when the switch is temporarily "pressed" by the user. The user may then move the remote-controller 105 to cause the cursor 112 to move on/near a selectable-object shown on an active-display 101. The user may then press the push-button-switch 104 to "select" a selectable-object that the cursor 112 is on/near.

In some embodiments, the selection-menu may be automatically removed from the active-display if the user does not "select" within a defined time (e.g., 5 seconds). Alternatively in other embodiments, the selection-menu may remain on the active-display 101 until the user "selects" a "menu-off" selectable-object.

In some other embodiments, the remote-controller 105 may have a single control-actuator 104 that has two positions. One position is defined as "display-menu-off". When the user presses the switch into the second position a "display-menu-is turned on" and when the user releases the control button a "selection" occurs. The control-actuator 104 may be configured (e.g., spring-loaded) to automatically return to the "off" position when the user stops pressing-on the control-actuator(s) 104.

In some other alternative embodiments, the remote-controller 105 may have a single control-actuator 104 that has three positions. The three switch positions may be defined as: "display-menu-off"; "display-menu-on"; and "select". The control-actuator 104 may be configured (e.g., spring-loaded) to automatically return to the "off" position when the user stops pressing-on the control-actuator(s) 104.

The control-processing 106 may be notified [via communication path 133] whenever the user activates a "select" (e.g., activates a control-actuator 104).

In some embodiments, whenever the user first activates (e.g., "clicks" the select-button):
 the active-display(s) may be automatically turned-on and/or
 selection-menu(s) may be presented on the active-active-display(s) 101 and/or
 a cursor 112 may be displayed on the active-display(s) at a location.

Depending on the embodiment, the displayed selection-options may be a default [e.g., high-level] menu or may be related to the current system context. The cursor 112 and/or the displayed selection-options may be activated for only a pre-defined time [e.g., 5-20 seconds] after the user has pressed the "select" button. The length of the predefined time-out may be independently optimized for each application and/or context. The cursor 112 and/or active-active-display 101 [e.g., menu-options] may be kept on, as long as the user continues to make selections within the pre-defined time-out period.

In one embodiment, a valid "select" may be assumed to occur only when the user activates a "select" (e.g., "clicks" the select-button or issues an audio-command) while both the cursor 112 is activated and selection-options are available on the active-display(s). When a valid "select" request is made, the cursor 112 location may be captured and/or determined.

In an alternative embodiment, a multi-position-control switch (e.g., 203) may be used. In one embodiment, the three switch positions may be:
 cursor 112 and active-display are both off (off-position).
 cursor 112 and display-menus are both activated;
  the cursor 112 may be positioned to a preferred starting/initial position on the active-display 101.
 the "select" position: the cursor location is captured and/or determined.

The three-position button/switch may be spring loaded so that it automatically returns to the off-position whenever the user is not pressing on it. The three-position-button may provide the user with greater control over when the control-selections are being displayed on the active-active-display 101 [since the user is not bothered by the automatic time-outs used in some of the other embodiments].

Active-Display(s):

An active-display 101, has the capability to change what is appearing on its display. An active-display includes any type of display where what is being displayed may be changed based on context and/or user control actions. Examples of active-displays 101 include cathode ray tubes (CRT); liquid crystal displays (LCD); HDTV displays; plasma-displays; surface-conduction electron-emitter displays (SED); projector displays; digital light processing (DLP) displays; micro-mirror projectors/displays; front-side or back-side projection displays (e.g., projection-TV); projection of images onto a wall or screen; computer-driven projectors; televisions; DVD-player-screens; light emitting diode (LED) displays; variable 3-D displays; variable holographic displays; and any other type of active/variable display.

In one embodiment, the active-display 101 is able to display a menu in a short enough delay after the user has activated (e.g., pressed) one of the control-actuators 104 of the remote-controller 105, that the user does not mind the delay. This may include the scenario where the display has been off, and the user wants to turn-on or use some of the electronic-devices 108.

The images that are displayed on the active-display(s) 101 may be controlled by the control-processing 106. In some embodiments, the active-display(s) 101 may show one or more control-menus or images with selectable-objects. In some embodiments, active-display(s) 101 may display images of selectable-objects, selection-options, control-selections or menu-options, that a user may select or interact-with.

In some embodiments, active-display(s) 101 may display a cursor 112 to enable a user to designate which object to select or the location where a user action will be applied. Active-display(s) 101 may also highlight a displayed object that a user may select.

When there are multiple active-displays connected, the active display with the best menu display capability may be used as the active control display 101. For example, in a home setting where there is a HD-television, DVD player, home theater system, music system, game system in a user room/ location; the HD-television display may be temporarily used as the active control display 101.

In some optional embodiments, multiple active-displays 101 may be active simultaneously and the control-processing 106 may coordinate activity across or between the multiple displays. In other embodiments, a single active-display 101 may be dedicated to the remote control function and may be used to control one or even all of the user's electronic-devices. In an alternative embodiment, multiple control-active-displays are made available at many locations and the user may control all their electronic-devices from any one of the displays they happen to be near.

In other embodiments, the active-display(s) 101 may be embedded within one or more of the electronic-devices being controlled and may be temporarily utilized to perform the remote control functions. For example, a television-display [or DVD player display; or home media-center display] may be temporarily used as the remote-active-display, when needed, in-order to temporarily display images of selectable-object(s)/selection-menus that control other electronic-devices that don't have their own display [such as a stereo system; Compact-Disk (CD) player; iPod player; Video Cassette Recorder (VCR); Digital Video Disk (DVD) player; Digital Video Recorder (DVR) and cable-channel box].

In other embodiments, the control function and active-display(s) 101 are integral to the electronic-device. For example, in a personal computer, the remote-controller 105 may be perform the same functions as a mouse (or any other type of computer pointing device) by acting upon or interacting-with selectable-objects that are displayed on the computer display.

Control-Processing Options:

The functions performed by the control-processing 106, depending on the embodiment, may include:
a) Receive and transmit data to/from the remote-controller 105.
b) Control the display of the selectable-objects and/or selection-menus that are displayed on the active-display(s) 101.
c) Process motion-sensor data/information that was received from the remote-controller 105.
d) Control the cursor position that is displayed on the active-display(s) 101.
e) Turn the device(s) being controlled 108 on or off.
f) Send and receive control information over the control interface(s) to/from the device(s) being controlled 108.

Figure 1C:
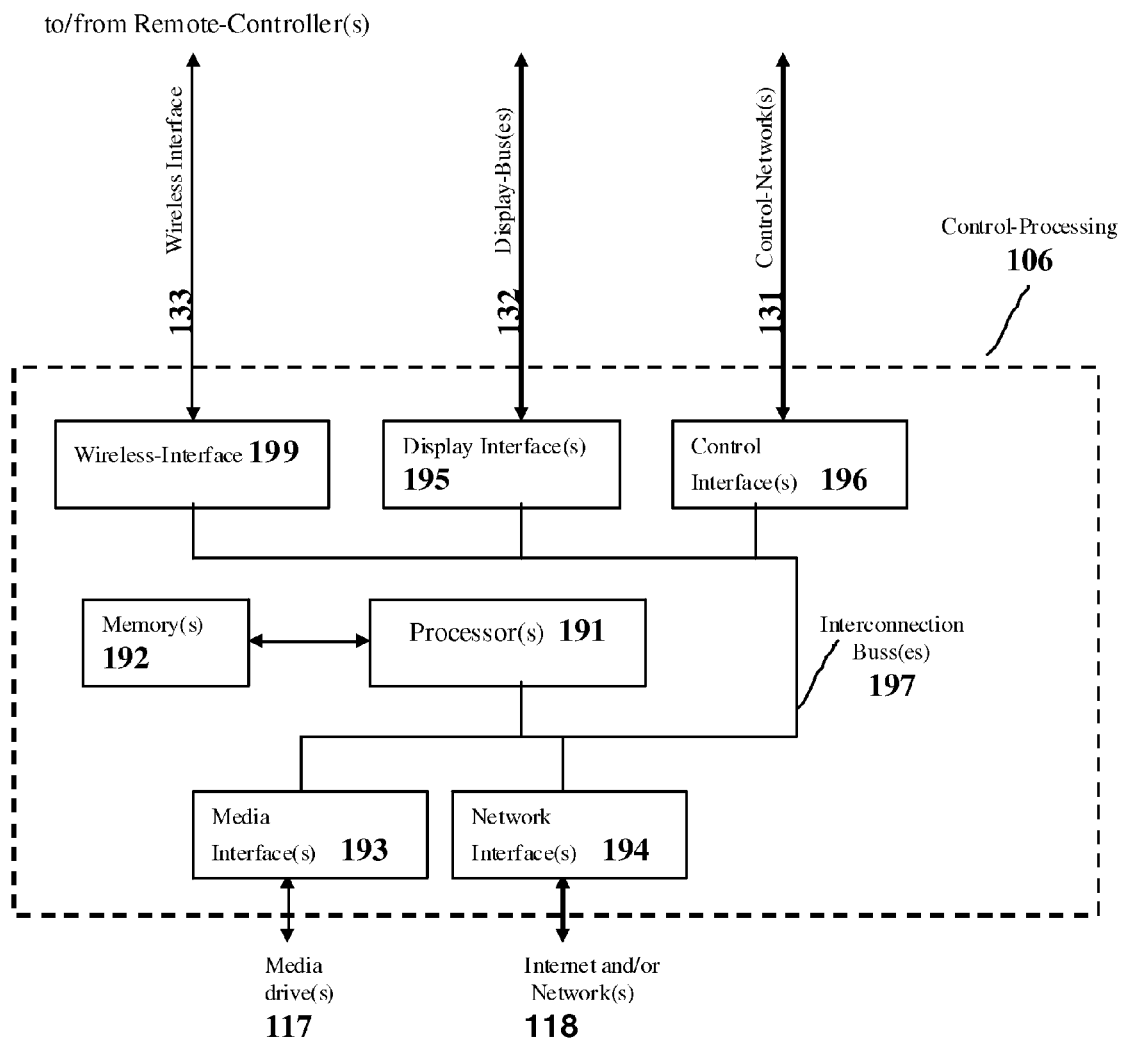
FIG. 1c illustrates one embodiment of a block diagram of the control-processing 106.

FIG. 1c shows an example of one embodiment of the control-processing 106. The control-processing 106 may include digital processor(s) 191, memory(s) 192, media interface(s) 193, network interface(s) 194, display interface(s) 195, control interface(s) 196, interconnection buss(es) 197 and wireless-interface 199.

In some embodiments, the wireless-interface 199 may be packaged together with the control-processing 106. In other embodiments, the wireless-interface 199 may be packaged separately from the rest of the control-processing 106, so that wireless-interface 199 may be positioned to provide a more line of site view of the wireless-interface 161 that is located in remote-controller 105. This may allow more flexibility in the placement, relative to the user and the remote-controller 105.

In some embodiments, the control-processing 106 may be packaged within or near the active-display 101, in-order to provide the wireless-interface 199 with a more line of site view of the wireless-interface 161 that is located in remote-controller 105.

In some embodiments, the wireless-interface 199 may be packaged as part of or near the active-display 101, in-order to provide the wireless-interface 199 with a more line of site view of the wireless-interface 161 that is located in remote-controller 105; while the rest of the control-processing 106 is located elsewhere.

In one embodiment, the control-processing 106 may be embedded in one of the electronic-devices being controlled 108. For example, the control-processing 106 may be embedded in the same package as one of the active-displays 101. In this case, the display-bus may be embedded within the active-display 101. A portion of the control-network 131 may be embedded with active-display 101, to control the active-display settings. In addition, the control-network 131 may extend external to the active-display 101 packaging to allow control of one pr more additional electronic-devices 108b-108k that may be external to the active-display 101 packaging.

The control-processing 106 may generate display menus that are sent to an active-display 101 over a display-bus 132. The display-bus 132 may be any type of wired or wireless communication path which has sufficient pixel resolution for the images being displayed. Examples include High Definition Multimedia Interface (HDMI); Digital Visual Interface (DVI); the VESA Display Port; Unified Display Interface (UDI); Display Data Channel (DDC); Wireless Digital Video; S-Video; EVGA; XVGA and VGA. The active-display 106 may also optionally receive set-up or configuration commands/controls from the control-processing 106 via a control-network(s) 131.

Menus and Selectable-Objects:

Selection-menus; control-menus; and selectable-objects may be displayed on one or more active-displays 101. In general, selectable-objects may be two-dimensional (2D) or three-dimensional (3D). In some embodiments, the user may move the remote-controller 105 in space, in-order to move a cursor 112 or to change the point-of-action (e.g., the currently highlighted selectable-object); onto one of the selectable-objects that are displayed on the active-display 101.

The menu-images and/or selectable-objects that are shown on the active-display(s) 101 may change over time as managed by the control-processing 106 and may be based upon the user actions; the operating state and/or the current-context. To reduce user complexity, only those selection-options that apply in the current context may be presented to the user at any given time. For example at a given time, the user may be presented with only that subset of control buttons that applies in the current context; rather than being presented with all the control buttons that appear on prior-art remote-controllers.

Figure 5:
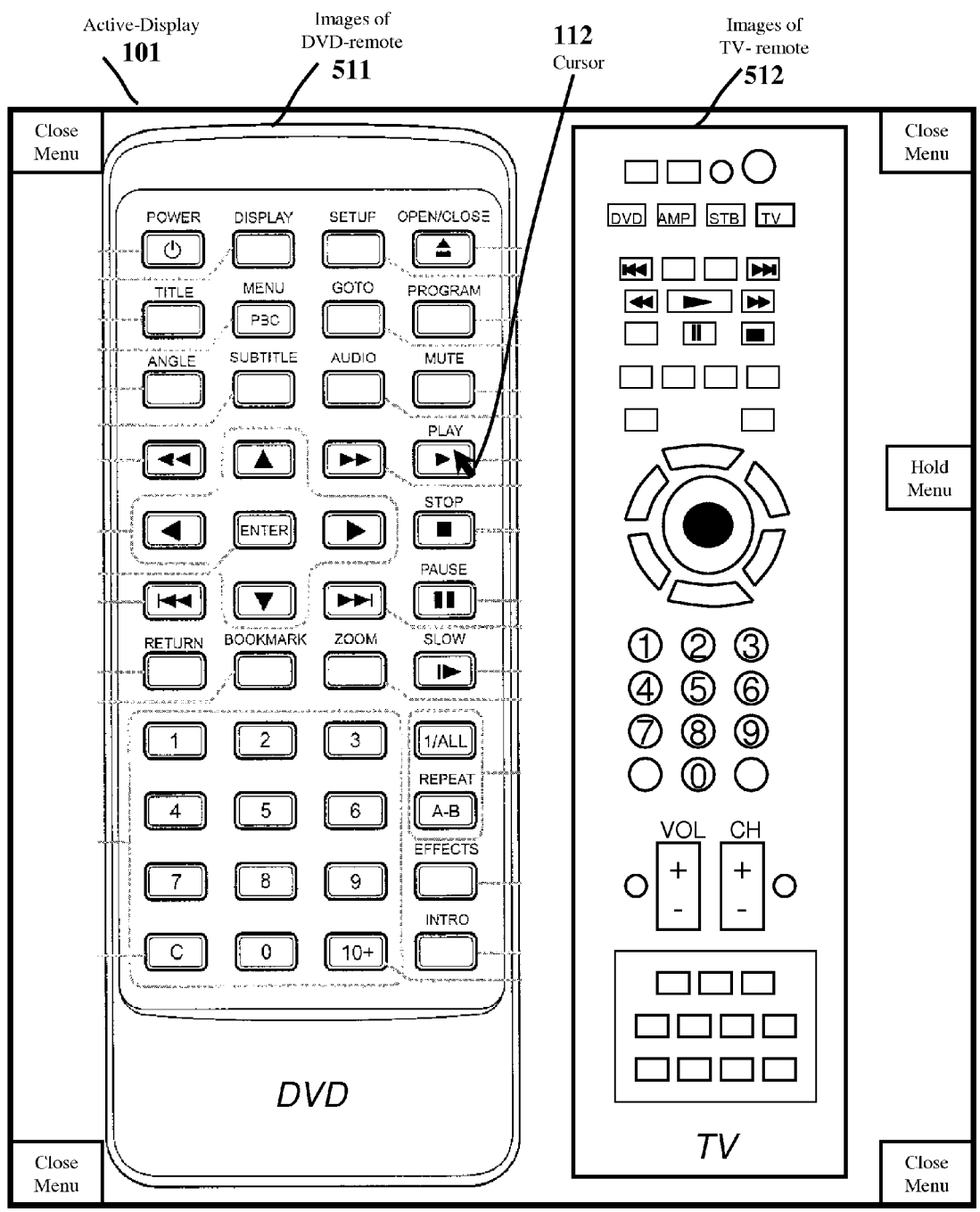
FIG. 5 illustrates an image of the individual control buttons of a prior-art remote being displayed on an active-display and the selection of an individual control button ("play") with the cursor.
Figure 6:
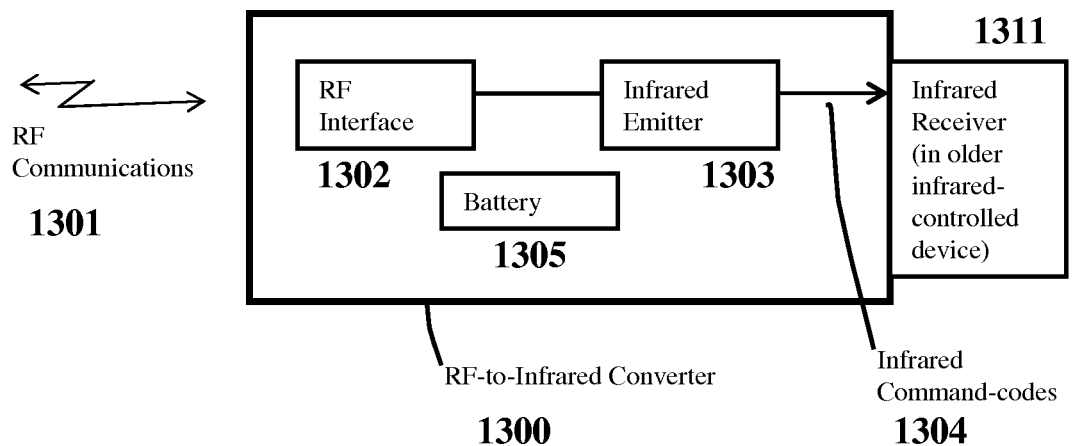
FIG. 6 shows a block diagram of an embodiment of an RF-to-Infrared Converter.

FIG. 5 shows one example of a menu-image that may be displayed on an active-display 101. In this example, an image 511 of the physical DVD-remote 11 and an image 512 of the physical TV-remote 12 may be shown on an active-display 101. As shown in FIG. 5, other selectable-objects, such as "Close Menu" and "Hold Menu, may also be shown on the active-display 101. A cursor 112 may also be shown on the active-display 101. As an optional enhancement, only those buttons that are effective are highlighted on the active-display 101, to indicate to the user (in the current context) which buttons are currently selectable-objects that may be selected. To control an electronic device, a user moves the remote-controller 105 so that the cursor 112, is "on" or "near" the desired control button of image (511 or 512) and then the user presses the control-actuator 104 on the remote-controller 105 to "select" that selectable-object (e.g., control-button on 511 or 512). FIG. 5 shows an example of the cursor being positioned, by the user, on the "play" button of the image of a DVD-remote. As an option, to make the user's selection easier, only those buttons that will have an effective in the current context may be displayed or "highlighted" on the active-display 101.

FIG. 4a to FIG. 4e show examples of selectable-objects that may be shown on an active-display 101. The selectable-objects may be any type of displayed-object such as text; icons; or images. For example, the user may be presented with a set of control-objects that the user may select from.

FIG. 4a shows another example of a menu-image that may be displayed on an active-display 101. In this example, six selectable-objects 121-126, any one of which the user may selected, are shown on the active-display 101. When the menu-image is initially shown on the active-display 101, a cursor 112 may initially be shown at a predefined location on the active-display 101. As a user moves the remote-controller 105 in space the location of the cursor 112 is correspondingly changed on the active-display 101. For example, if a user moves the remote-controller 105 "up" ("down") in space then the cursor 112 is moved higher ("lower") on the active-display 101. If a user moves the remote-controller 105 "to the right ("to the left") in space then the cursor 112 is moved "to the right ("to the left") on the active-display 101.

Figure 4C:
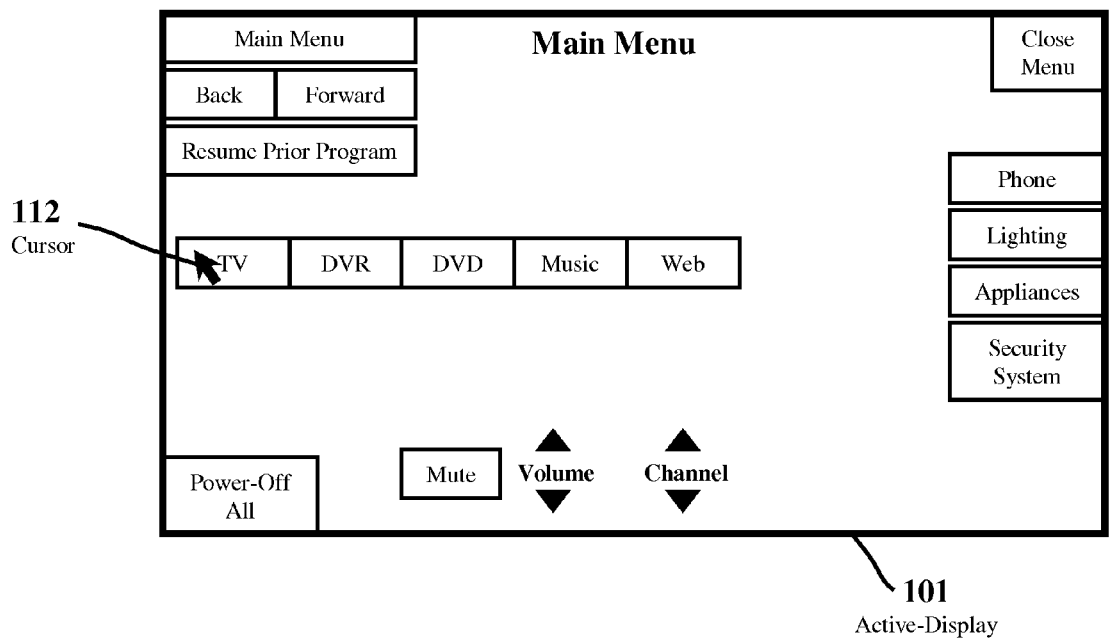
FIG. 4c illustrates examples of selectable-objects on an active-display that a user may select using the cursor.

For example in FIG. 4c, the user may select one of the control-objects shown on the active-display 101: "TV"; "DVR"; "DVD"; "Music"; "Exit" 404. For example, if the user places the cursor 112 on/near the "TV" selectable-object and activates a "select", a "TV menu" with options for controlling television(s) (FIG. 4d) may be then be displayed on the active-display 101. Or alternatively, if the user places the cursor 112 on/near the "DVD" selectable-object and activates a "select", a menu of options for controlling the DVD-player (FIG. 4e) may be then be displayed on the active-display 101.

As shown in FIG. 4c, the active-display 101 may also contain selectable-objects that control and/or configure a device. For example, when the cursor 112 is on the channel-up-arrow or channel-down-arrow and the "select" is activated, then the device's current channel may be change. Similarly, when the cursor 112 is on the volume-up-arrow or volume-down-arrow and the "select" is activated and then the device's volume may be changed. In some embodiments, the menu-selections may only temporarily utilize a small portion of the active-display or may be transparent so the underlying images are still visible. In alternative embodiments, a dedicated portion of an active-display 101 may display the currently needed menus-selections.

Figure 4D:
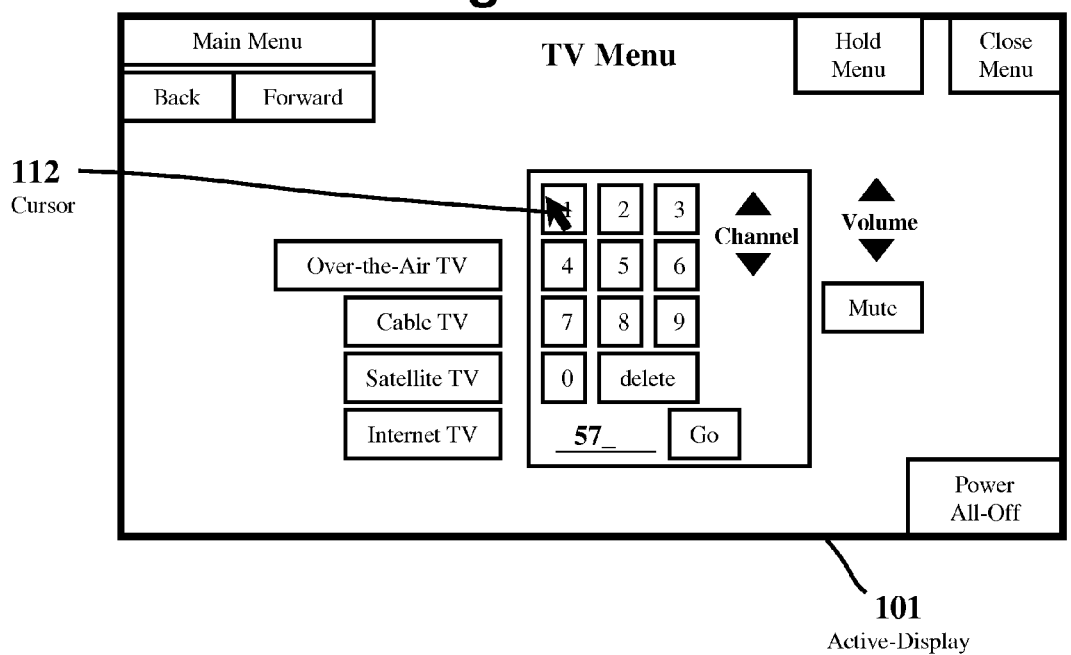
FIG. 4d illustrates examples of selectable-objects on an active-display that a user may select using the cursor.
Figure 4E:
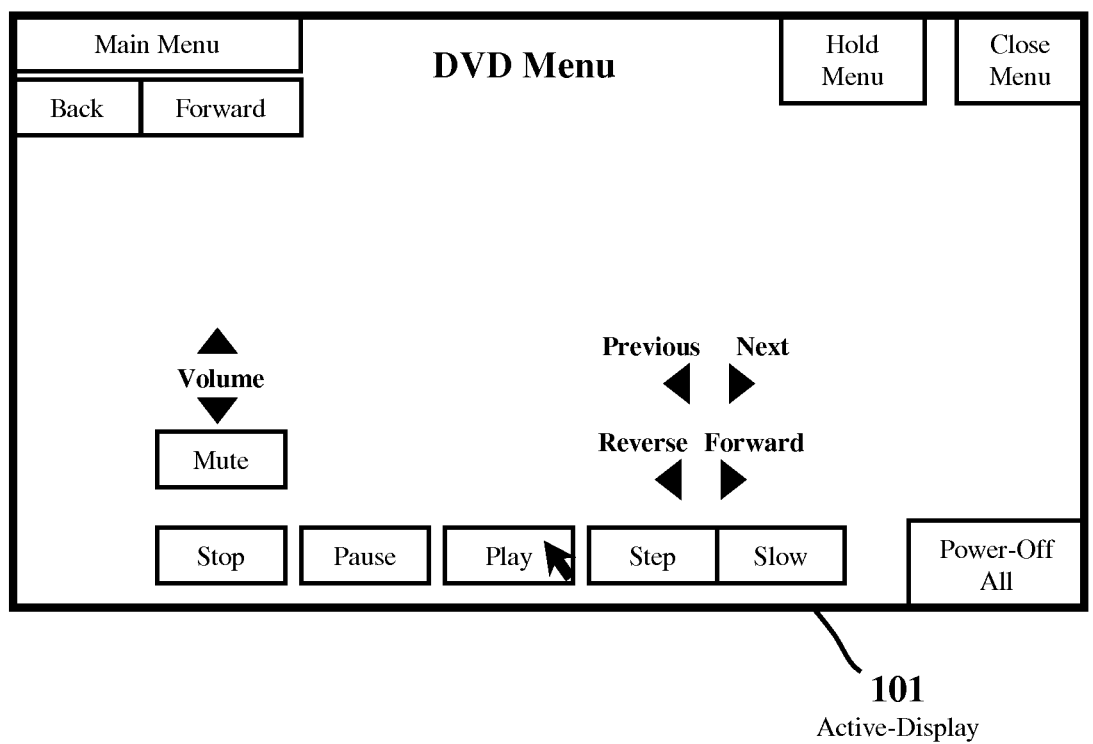
FIG. 4e illustrates examples of selectable-objects on an active-display that a user may select using the cursor.

In some embodiments, a virtual-keyboard containing a display of alpha-numeric characters and/or symbols, may be temporarily presented on the active-display 101; so the user may select a sequence of the symbols as a control "input". FIG. 4d illustrates one example of a numerical entry of a channel number by a user. As shown in FIG. 4d, a "TV menu" shown on an active-display 101 may include a virtual-keyboard (with the numbers 0 thru 9, as well as other virtual-keys). The user may then use the cursor 112 to select a sequence of numbers to go to a specific channel (e.g., select "5" then "7" then select "go" to cause the TV to display the programming on channel 57. The numbers may be shown in their selected sequence on a portion of an active-display 101, so the user may verify what is happening (e.g. "57_" may be displayed after the first two selections have been made).

Moving the Cursor and/or Moving the Point-of-Action:

In some embodiments, a user may try to hold the remote-controller 105 (approximately) motionless, when the user actuates a control-actuator 104, in-order to activate both the remote-controller 105 and the active-display 101. In some embodiments, a user may also try to hold the remote-controller 105 (approximately) motionless, when the user actuates a control-actuator 104 to "select" a selectable-object on the active-display 101.

When the remote-controller 105 is initially activated, the cursor 112 may be placed at predefined starting location on the active-display 101, which is independent of any prior activity. In this way, the effects of long term drift that may occur in the calculated location of the cursor 112, may be made less significant. That is, long-term drift that occurs between two different usages/activations of the remote-controller 105 may be eliminated.

The amount that the cursor 112 moves relative to the amount that the remote-controller is moved, may be optimized for different embodiments. In some applications the amount of movement may be may be matched (e.g., if the remote-controller moves 1 inch in space, the cursor may move a corresponding 1 inch on the screen). In other applications, the cursor 112 may be moved by a multiple of the movement of the remote-controller 105 (e.g., if the remote-controller moves 1 inch in space, the cursor may move a corresponding 8 inches on the screen). In other applications, the cursor 112 may be moved by a fraction of the movement of the remote-controller 105 (e.g., if the remote-controller moves 2 inches in space, the cursor may move a corresponding 1 inch on the screen). As an option, a "movement-ratio" parameter may be configurable so the ratio of the amount cursor movement relative to the remote-controller movement can be optimized for different user applications.

The preferred "movement-ratio" value may depend of the size of the size of the active-display 105. In general, the larger the active-display 105, a greater movement of the cursor 112 for a corresponding movement of the remote-controller 105 may be desired by users.

The preferred "movement-ratio" value may also depend on the fineness of cursor positioning needed for the application on active-display(s) 101. For an application where the user only needs to select between a few large-sized selectable-objects on the active-display, then it is more likely that user's may prefer that the cursor 112 be moved by a multiple of the movement of the remote-controller 105.

In an optional embodiment, the size of the active-display 101 may be automatically determined by the control-processing 106, and the "ratio" may be automatically configured based upon the size of the active-display 101 and the precision needed to select the selectable-objects that are displayed on the active-display(s) 101.

Wireless Communication:

The communication path 133 may be implemented as a wireless interface. The remote-controller 105 may have a wireless interface 161 in-order to wirelessly communicate 133 to/from the control-control-processing 106; so that the remote-controller 105 may be unconstrained by cords/wires. Some examples of wireless include electro-magnetic (EM); infrared (IR); Radio-Frequency (RF); WiFi; WiMax; Bluetooth; sonic or ultra-sonic communication.

In general, the wireless-communication 133 should be designed to be insensitive to the normal movement and orientation changes of the remote-controller 105. In general, the antenna configurations may have a reasonably wide antenna beam-width (e.g., not excessively directional). In some embodiments, the wireless-communication may be configured to operate without needing direct sight (e.g., certain RF frequency bands) from the remote-controller 105 and the wireless-interface 104 so that the user has greater freedom in placing their electronic-devices [such as: out of view; hidden inside cabinet(s); etc].

The distance from the remote-control 105 to the active-display(s) 101 may vary over a wide range of distances in different embodiments. The remote controller may be used to control devices that are across a room in a work; home or other setting. The operational distance of the wireless interface between the remote-controller 105 and wireless-interface 104 may be limited to the user's line of sight maximum distance to the active-display 101. Typical operational distances in a home may be roughly 5 to 50 feet. For applications with huge displays (e.g., movie theatre screen sizes), the distance may extend to 100 or 200 feet or more. As an option, the operational distance may be made to be adjustable or may automatically adjust the transmitted-power based upon received signal size. As an option, the operational frequency bands and/or channel may be adjustable or automatically adjustable.

In some embodiments, the wireless interface 161 may be bi-directional (e.g., able to both transmit and receive) so that the remote-controller 105 may receive feedback-status back from the control-processor 106. Such feedback-status may be used to influence the status indicated by the status light (e.g., flashing light) included in the remote-controller 105.

In some embodiments, wireless methods that does require accurate pointing will be preferred. Wireless communication that requires less accurate pointing includes electro-magnetic (EM) and Radio-Frequency (RF). Examples of RF include radio channel transmission over the un-licensed 2.4 Ghz frequency bands, WiFi or Bluetooth. In some embodiments, a wireless method that requires accurate pointing toward the receiving unit (e.g., typical Infrared used in prior art remotes) should be avoided. Examples of low power industry-standard RF protocols include ZigBee, 802.15.4, SimpliciTI, 6LoWPAN, reduced-range WiFi, 802.11, regional 700/800/900 MHz and the worldwide 2.4 GHz frequency bands. Those skilled in the art will be aware of many other possible frequency bands and protocols that may be used.

In one particular embodiment, the communication path 133 between the remote-controller 105 and the control-processing 106; is implemented using a non-line-of-sight wireless channel(s). For example, the communication path 133 between the remote-controller 105 and the control-processing 106 may accomplished using radio-frequency (RF) communication; so that the remote-controller does not have to be within line-of-sight with the control-processing 106 and does not need to be accurately pointed at the corresponding receiving unit.

In some embodiments, it may be desirable to lockout rogue remote-controllers, by limiting remote-control to only particular remote-controller(s). The control-processing 106 may be configured to only accept communication and commands from remote-controllers that know predefined access-codes or identifier-codes/passwords. In some embodiments, each remote-controller 105 may utilize its own unique ID-code. In some embodiments, encryption (e.g., symmetric-key and/or public-key encryption) may be used to secure communication contents across the wireless interface 133.

In another embodiment, the remote-controller 105 may communicate to an interface [e.g., receiver/transmitter] located near the active-display 101, which then communicates to the control-processing 106. This may assure a more line-of-sight communication to/from the remote-controller 106.

Processor Implementations:

As shown in FIG. 1, processing may be divided between remote-processing 171 (which is located in the remote-controller 105); and control-processing 106. To minimize the power consumption and increase the battery (or power storage unit) life of the remote controller 105, the remote-processing 171 may be configured to minimize the overall power consumption of the remote-controller 105. For example, more power intensive operations may be performed by the control-processing 106, instead of by the remote-processing 171 in the remote-controller 105.

In general, depending on the embodiment, the remote processing 171 may use any combination of analog circuitry, digital circuitry, and digital processing. In some embodiments, the remote-processing 171 may include processing of the analog domain. For example, motion sensor outputs that are analog may be integrated in the analog domain [e.g., using capacitor(s)]. In some embodiments, the remote-processing 171 may include circuitry to convert a motion sensor output that is in the analog domain into digital domain [e.g., analog-to-digital converter; pulse width modulators; interval counters; etc].

The remote-controller 105 may include some remote-processing 171 that encodes the motion sensor output/data for communication across a communication path 133 to control-processing 106. In some embodiments, the remote-processing 171 may translate or format the inertial sensor output into an encoded analog or digital communication signal that represents the 2D or 3D movements of the remote-controller 105 and the state(s)-of or change(s)-to the control-actuators 104 (e.g, pressed or released).

In general, depending on the embodiment, the control-processing 106 may be implemented using any combination analog circuitry; digital circuitry; or one or more digital processors. The control-processing 106 may be in a single location or distributed across multiple physical locations (e.g., enclosures or devices) that are connected via a communication paths such as a network.

For example, the processing may be located with or within or distributed across: the remote-controller 105 or active-display(s) 101 or the electronic-device(s) being controlled or may be in a separate enclosure(s). In some embodiments, the control-processing 106 may be shared with the devices-being-controlled 108.

The control-processing 106 may include interface circuitry to allow communication 133 with the remote controller 105. The control-processing 106 may include interface circuitry to allow communication 132 with the active-display(s). The control-processing 106 may include an interface with the control network(s) to allow communication the device(s)-being-controlled 108a-108k. The control-processing 106 may include interface(s) with one or more media drives 117 (e.g., CD or DVD). The control-processing 106 may include interface(s) with the Internet or other external networks 118.

Digital processing may be implemented as digital circuitry (electronic circuitry) by using any combination of: a computer or general-purpose-processor(s) capable of executing software programs (e.g., microprocessors); Digital Signal Processor(s) (DSP); a dedicated hardware processing device; integrated-circuit(s) [IC's]; Application Specific Integrated Circuits [(ASIC's] or Field Programmable Gate Arrays [FPGA's]; or any other type of other digital/electric/electronic circuitry. The processor functions/instructions may be defined using any combination of software, firmware, and Reconfigurable FPGA configuration data which may be stored on/in Read Only Memory (ROM); DRAM, SRAM, EEPROM, Flash, storage media, disk drives, or any other method of digital data storage.

The processing may be embodied as a program for execution by a processor such as a computer or DSP, and as a storage medium storing such a program. Further, the processing may be implemented as a method, apparatus, program or storage medium for separate application to a server [or client] on a communication network.

As an option, the processing instructions and/or configuration data may be updated if later versions (that correct bugs or offer improved performance) were to become available. These updates can be received from a network (e.g., Internet) or via "computer-readable medium".

Many vendors (e.g., Atmel; Texas Instruments; and many other suppliers) offer off-the-shelf, semi-custom and customized integrated circuits that integrate together microcontroller and wireless interfaces into a single the same integrated circuit. A variety of internal oscillators, timers, UARTs, SPIs, Pulse Width Modulation, pull-up resistors, Analog-to-digital-converters (ADCs), Analog Comparators and Watch-Dog Timers are also included in some of these off-the-shelf chips. As an example, the Atmel ATmega128RFA1 is an IEEE 802.15.4 compliant single-chip, combining a AVR microcontroller and a 2.4 GHz RF transceiver. Another example, the Atmel AT86RF230 is a low-power 2.4 GHz transceiver specially designed for low cost IEEE 802.15.4, ZigBee and 6LoWPAN applications.

Processing Functions and Approaches:

Depending on the specific embodiment, the control-processing 106 may perform one or more functions including:
  Maintain knowledge of the devices 108a-108k that are connected to a user's system.
  Control and maintain knowledge of what is currently being displayed on each of one or more active-displays 101 including knowledge of all the selectable-objects.
  Maintain a database of selection-menus and control-menus for each device.
  Access or receive database; menu; and/or control information from media inserted in user-devices being controlled (e.g., DVD menu information).
  Determine the location(s) and object(s) the cursor 112 designated.
  Determine which of several devices or displays, the user-control actions correspond to.
  Change the state or mode of the appropriate device based on user selections and/or control-actions.
  Change what is shown on the active-display 101 based on user "selections", control-actions and/or the current context.
  Maintain a pre-programmed sequence of display images and/or selectable-objects that are dependent on the ordering of user selections.
  In some embodiments, determining which one of a plurality of active-displays 101 is currently being used.
  Other functions that are disclosed in this specification.

Figure 12:
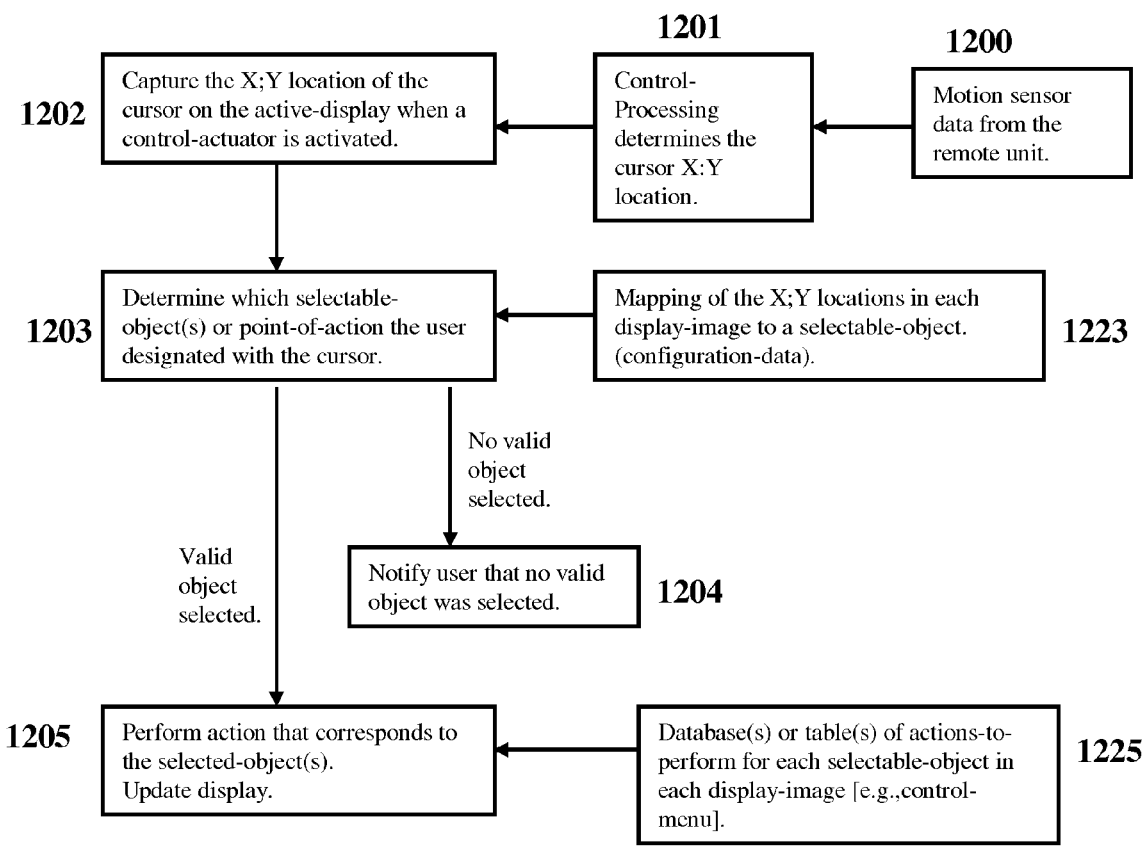
FIG. 12 shows one embodiment of a processing flow chart for determining and performing a user's intended action.

FIG. 12 shows one embodiment of a processing flow chart for determining and performing a user's intended action.

In block 1202, the control-processing 106 may "capture the X;Y location of the cursor 112 on the active-display 101 when a control-actuator 104 is activated".

In block 1203, the control-processing 106 may "determine which selectable-object(s) or point-of-action the user designated with the cursor 112". The control-processing 106 may utilize a "mapping of the X:Y locations in each display-image to a selectable-object" 1223. FIG. 7b shows a simplified example of such a mapping. The display-images may include control-menus; selection-options; and/or an interactive-image [e.g., for an interactive drawing or word-processing application]. For some display-images, some X:Y locations may not be associated with any selectable-objects [e.g., are white-space or a non-selectable region]. For embodiments that are similar/equivalent to a computer-mouse, this process may also include establishing a new cursor 112 location or determining the point/area in a computer display that is "selected".

Each "selection" menu may have known locations for its selectable objects. A mapping or lookup table may be pre-created for each menu-image which translates each display location to one of the selectable-objects or a non-selectable region.

In some embodiments, multiple menu-images may share the same mapping table when all their selectable-objects are at the same locations. Table sizes may also be reduced in some embodiments by sequencing through multiple levels of mapping tables.

If the processing determines that "no valid object was selected" (block 1203), then the user may be notified of the selection error in block 1204.

Per in block 1205, if the processing determines that "a valid object was selected" in block 1203, then the control-processing 106 may perform the action that corresponds to the selected-object(s) and update the active-display(s) with new display-image(s). The processing may utilize "database(s) or table(s) of actions-to-perform for each selectable-object that appears in each display-image" 1225. FIG. 7a shows a simplified example of such a table.

Once the control-processing 106 has determined the selected-object or point-of-action, then action(s) may be taken that correspond to that the user's selection. Configuration-data 630 may be provided to the control-processing 106 to facilitate this. This configuration-data may include a database or tables that define what actions to take for each selected-object in each control-image/menu.

In some embodiments, the selected-object [or the selected-point-of-action] may be the highlighted on an active-display 101 in a way that also allows the user to simultaneously visually "see" that their intended selection has occurred. For example, the selected-object may be "highlighted" using a unique color; brightness; shading; framing; underlining; or modulation/blinking pattern.

Examples of the types of actions that may be taken include:
  Control-actions on one or more electronic-devices being controlled (e.g., "change the channel" or "change the source"). Control-actions may be communicated to the specific electronic-device(s) 108a-108k being controlled over a control-network(s) 131.
  Displaying new image(s) or modifying the prior image(s) appearing on the one or more active-displays 101. New display-images may include control-menus; selection-options; and/or an interactive-image [e.g., for an interactive drawing or word-processing application].
  Highlighting or modifying the selected-object(s). This may include taking actions that modify the selected-object.
  Displaying pop-up menus; information overlays; or additional details associated with the selected-object.
  Any type of action equivalent to a computer mouse or other computer-pointing-device used to control or interact with a computer or other electronic device.
  The actions to be taken may be defined in advance (e.g., configuration-data) using table(s); database(s); flow-charts; conditional event sequences; state diagrams; conditional programming; or any other method.

FIG. 7b shows part of a simplified table that may be used to map a cursor 112 location to a particular selectable-objects present in the display-region. For each control-menu (e.g., control-menu 5), a selection-region may be is defined for each selectable-object that is in that menu-image. In this example, the second column of FIG. 7b defines the X:Y coordinates of the four corners of the rectangular selection-region that define the selection region for each selectable-object in the display-region. More generally, the selection-region for each object may be defined to have any desired shape.

FIG. 7a shows a part of a simplified table that may be used to map from each selectable-object to the specific control-action(s) that are associated with each selectable-object in each control-menu image. This example may be typical of the remote controlling a television or a DVD-player or similar electronic-device. For example, per the second row of FIG. 7a, if "control-menu 5" is being displayed and the user "selected" the "up-volume" selectable-object, then "the volume is increased by 1 increment " and "control-menu 5" is presented to the user again so the user may make additional "control-type" selects that are available on that image. Entries may be provided for all menu-images that contain selectable-objects and for all selectable-objects that are in each menu-image.

Control-Networks(s):

The control-network(s) 131 may allow control-commands to be communicated from the control-processing 106 to the device(s) being controlled 108a-108k. The control-network(s) 131 may also allow status to be communicated from device(s) being controlled 108a-108k to the control-processing 106.

The control-network(s) 131 may be implemented using any combination of wired and wireless communication technologies. Typical examples include coaxial cables; twisted pair cables; Ethernet networks; communication busses; Electro-optical (EO); fiber-optics cables; electro-magnetic (EM); infrared (IR); Radio-Frequency (RF); WiFi; WiMax; Bluetooth; sonic or ultra-sonic communication; cell phone networks; and the Internet. Any combination of network(s) and point-to-point communication approaches may be used.

In one particular embodiment, the control-network 131 is implemented using a non-line-of-sight wireless channel(s) (e.g., wireless radio-frequencies); so that the devices-being-controlled 108a-108k do not have to be within line-of-sight with the control-processing 106. Examples include WiFi and Bluetooth.

In another particular embodiment, the control-network 131 is implemented using a power-line network; so that the control-network 131 is established between the control-processing 106 and the devices being controlled when the user plugs the power cord for each unit unto a wall power outlet.

In some embodiments, the control-network 131 may also include a plug-and-play capability.

In some embodiments, the control-network 131 may also allow status information to be communicated from device(s) being controlled back to the control-processing 106. Status may be useful to allow problems to be automatically detected by the control-processing 106 and to provide debugging help to be displayed to the user on the active-display(s) 101. Examples of status. Units reporting back that they are powered and self-test ok. Units reporting back they are not receiving a signal from another unit. A few examples: a) a cable is not connected or is unplugged b) interfaces are working ok c) video is being received from DVD player ok.

In some embodiments, a non-direct line-of-sight wireless communication network (such as Bluetooth or WiFi) with plug-and-play capability may be used for control-network 131. This may allow the electronic-devices being controlled 108a-108k to be located anywhere (including out-of-sight) and may reduce the cabling between the electronic-devices.

In another alternative embodiment, portions of the control-network 131 may utilize the Internet or other Wide-Area-Network [e.g., cell-phone network] to allow devices to be remotely controlled from other locations [e.g., home devices controlled from work or another location].

Plug-and-Play Capability:

In some embodiments, the control-network(s) 131 may have a plug-and-play or automatic device-discovery capabilities. When the user adds or removes devices-being-controlled to their system, the change is automatically detected by the control-network(s) 131 and the control-processing 106 is notified so appropriate action may be automatically performed with minimal/no user action. Examples of communication and network standards that support automatic discovery and/or plug-and-play capabilities include Ethernet; WiFi; Bluetooth; Universal Serial Bus (USB); Wireless-USB; Power-line-networks; and many others.

Figure 11:
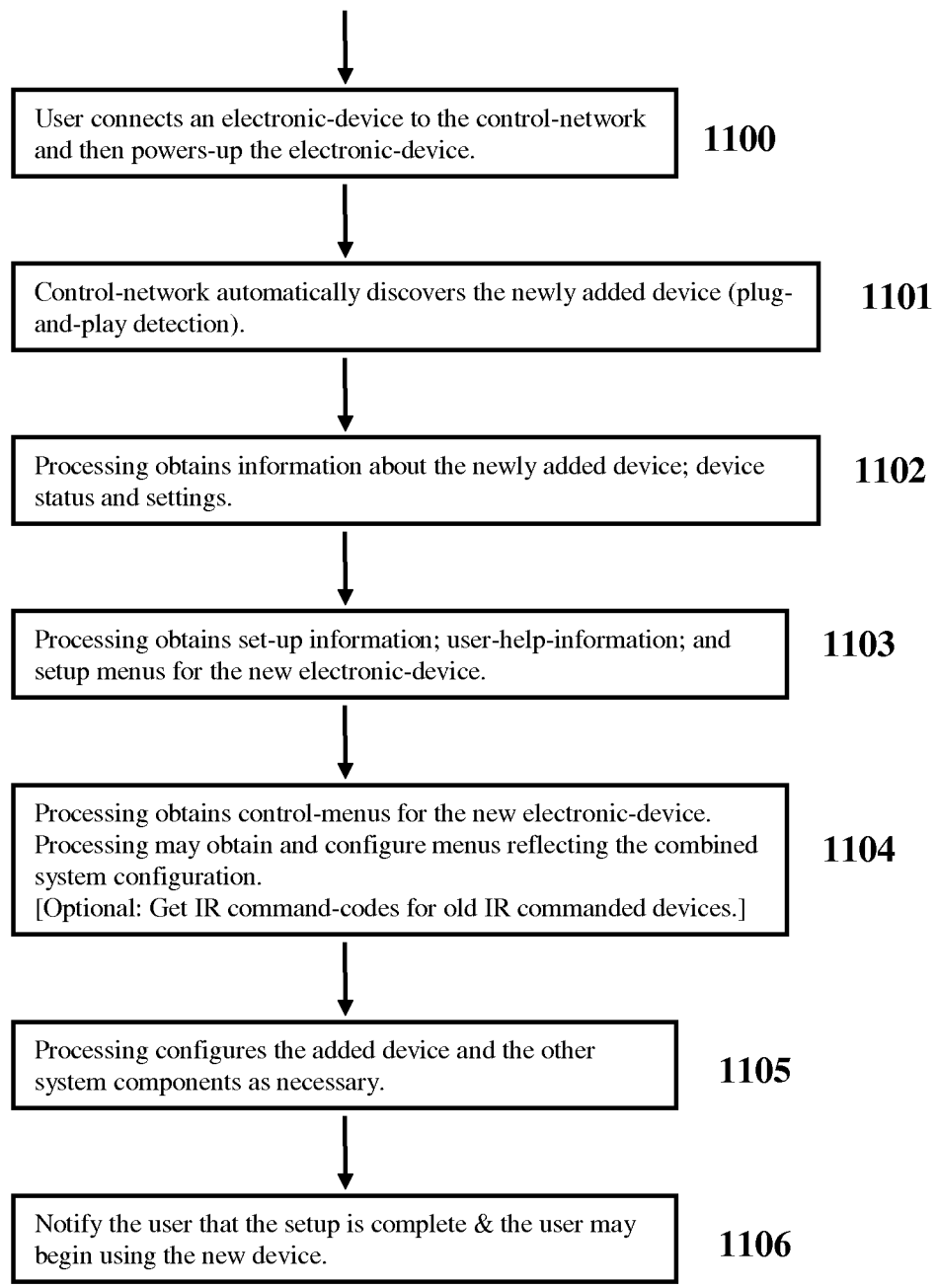
FIG. 11 shows one embodiment of a flow diagram for the automatic discovery and set-up (e.g., plug-and-play) when a new electronic-device is added/removed from the system.

FIG. 11 shows a flow diagram for one embodiment of the automatic discovery and set-up [plug-and-play] of a new electronic-device that the user has added to their system. Depending on the embodiment, any given functional block in FIG. 11 may be: optional or performed in a different order; and/or multiple blocks may be combined into one block.

In block 1100, the user powers-up the electronic-device and connects the electronic-device to the control-network 131 [such as a WiFi or Ethernet network]. In some embodiments [e.g., wireless WiFi], the connections may be pre-configured to automatically occur without requiring any user action.

In block 1101, the control-network 131 automatically discovers the newly added electronic-device that is now on the control-network 131.

In block 1102, the control-processing 106 may obtain information that identifies the newly added device. The information obtained by the control-processing 106 may include such as the device-model-number; device-ID-number; device-serial-number; present device-status and current device settings.

In block 1103, the control-processing 106 may then obtain information such as set-up information; user-help-information; and set-up menus for the newly added electronic-device. Some of this information may be obtained from the electronic-device itself over the control-network 131. In some embodiments, the control-processing 106 may obtain this information or updated information over the Internet or another external network by using communication path 118. In other embodiments, information may be obtained from media that is placed into media-drive(s) 117 that are attached to the control-processing 106. In other embodiments, information may be obtained from media that is placed into a media-drive(s) that is part of the newly added electronic-device.

In block 1104, the control-processing 106 may then obtain and configure control-menus; operational-menus and user-help-menus for the newly added electronic-device. For cases involving older infrared-code controlled electronic-devices, the processing may acquire the infrared signaling-codes used for controlling the device.

In some embodiments, the processing may also obtain and configure control-menus that are customized to the electronic components in the user's unique systems. For example, one menu may show a selectable listing of all the devices that the user may presently control. For example, all the different TV channels or programming sources [satellite; cable; airwaves; Internet] that are currently available to the system, may be organized together on a combined control-menu(s). For example, all the volume controls on the different devices may be coordinated through a combined volume menu.

In block 1105, the control-processing 106 configures the added device and the other system devices as necessary in-order to be interoperable with all of the other user's electronic devices.

In block 1106, the user may be notified that setup is complete and the user may operate and control the added device using the display menus.

Figure 3:
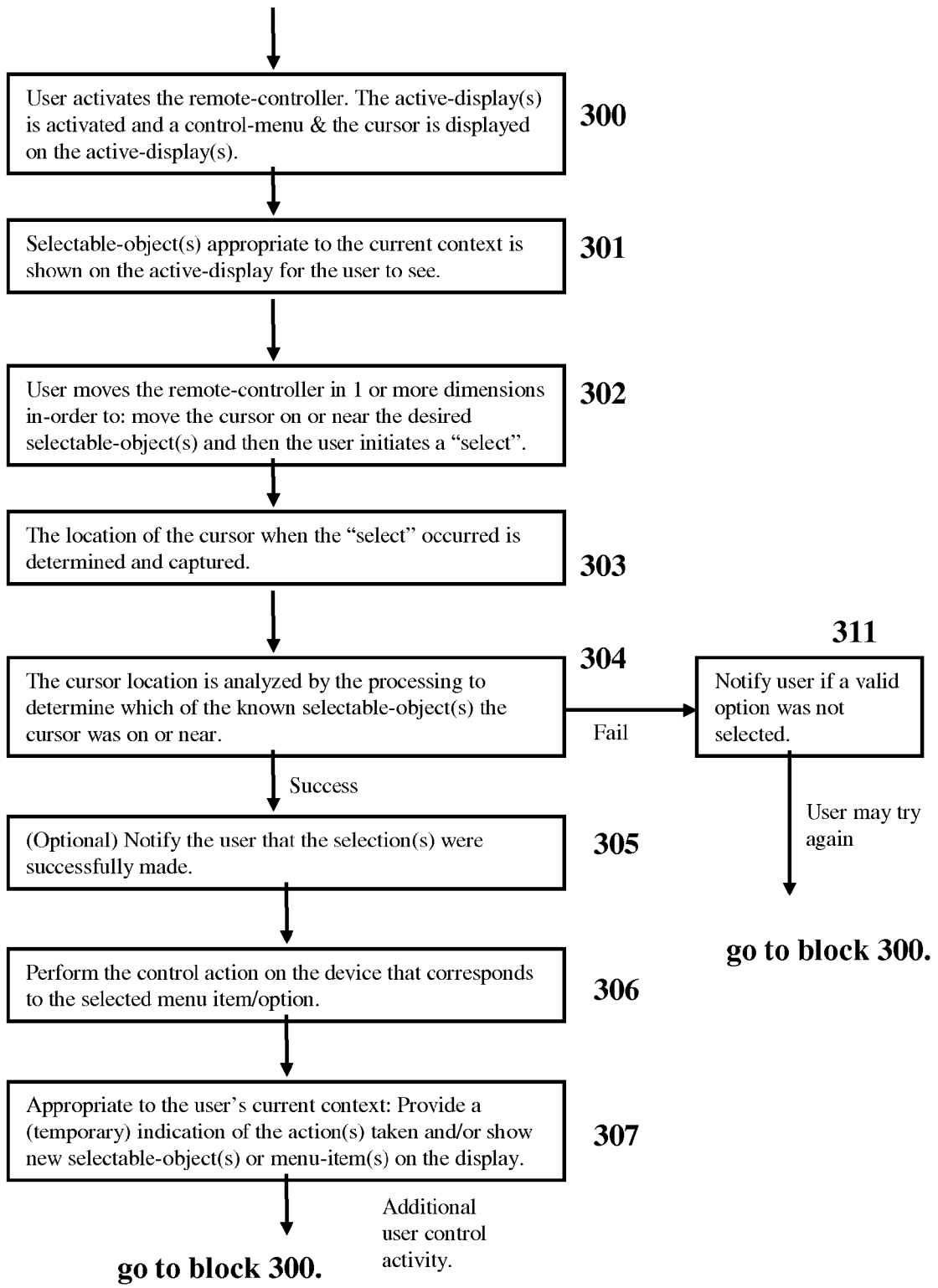
FIG. 3 is a functional block diagram for using a cursor-location to control an electronic-device for one embodiment.

Example: Selection Using Control-Menus:

FIG. 3 illustrates a simple example where a user may remotely control one or more electronic-devices 108a-108k by selecting from menu-options that are displayed on an active-display(s) 101. Devices that may be controlled by menu-selections include televisions; HDTV; home-entertainment-systems; home theatre systems; cable-boxes; satellite-TV equipment; media-centers; Digital Video Recorders (DVR); TiVo; DVD-players/recorders; VCR's; media players; CD players; music players/systems; digital music devices; personal computers; computers; displays; appliances; lighting systems; sound systems; security systems; video game systems; games; toys; and heating/cooling systems.

In a simple embodiment, the user may place the cursor 112 on a selectable-object in a display region and then press the single button 104 [e.g., "select"] that is on the remote-controller 105, to cause desired control-action to occur.

As shown in block 300 of FIG. 3, the user activates the remote-controller 105 which also activates the active-display and a control-menu and cursor 112 is displayed on the active-display 101. In some embodiments, the user may need to click or double-click a control-actuator 104 or hold down a control-actuator for a defined time (e.g., 2 seconds), in-order turn-on/activate the remote-controller 105 and active-display 101.

In block 301, selectable-object(s) [e.g., selection-options or menu-items] appropriate to the current context may be presented to the user on active-display(s) 101.

In block 302, the user moves the cursor 112 on or near the desired selectable-object(s) on the active-display(s) 101; and the user initiates a "select". Depending on the embodiment, a "select" may be initiated in various ways including:

a) The user presses a control-actuator 104 to signify "select".

b) The user may release a control-actuator 104 to signify "select".

The occurrence of the user activating the "select" may be signaled to the control-processing 106 via communication path 133.

In block 303, the location of the cursor 112 when the "select" occurred is determined and captured.

In block 304, the cursor 112 is analyzed by the processing to determine which of the known selectable-object(s) the cursor 112 was on or near, when the "select" was made.

If the analysis in block 304 indicates that the cursor 112 was not on or acceptably close to one of the known selectable-object(s), then the user may be notified that no valid selectable-object(s) was selected with the cursor 112 (block 311). The user may be notified in various ways including: a visual indication on the active-display 101 or via an audio message (e.g., a voice message) and/or a sound (e.g., a beep). If the user-did not make a valid selection, flow control moves to block 300 where the user may try again.

If the analysis succeeds in identifying specific selectable-object(s) then user may be optionally notified of the success (block 305). The user may be notified of the action taken in various ways including: make the selected-object(s) into a "Highlighted-object(s)" on the display and/or providing another visual indication on the active-display 101 and/or providing an audio message or sound.

In block 306, the control-action(s) that correspond to the selected-option is communicated to the device-being-controlled 108a-108k. A few examples of possible control-actions include:

Increasing or decreasing the volume.

Changing the channel up or down or going to a selected-channel.

The selected video or music selection may be started.

The next (forward) or previous (back) item in the playback sequence may be started.

In block 307 as appropriate to user's current context, various items may be now shown on the active-display 101. This may include:

Highlighting [perhaps temporarily] the object the user selected on the display.

A temporary visual indication of the action taken [e.g., a symbol showing that the volume was increased].

Different selectable-object(s) [menu-items and/or selection-option(s)] may be presented to the user on the active-display 101.

Removing all selectable-object(s) [menu-items and/or selection-option(s)] from the active-display 101 (e.g., when all selections have been completed).

The user may now make additional selections or take additional control actions by continuing at block 300.

In some embodiments, the selection-menu(s) [e.g., control-menus or selectable-object(s)] options may be automatically removed from the active-display 101 when the user does not take any action after a defined period of time. For example, the selection-menu(s) may be automatically removed from the active-display 101 after 5 seconds of inactivity.

Note that, in some embodiments, configuration-data (as discussed elsewhere) may be used in one or more of the blocks shown in FIG. 3. In some embodiments, a one time setup may be performed for each user-device in-order to identify (e.g., model number) and to provide the needed configuration-data to the control-processing 106, prior to controlling the electronic-device.

Additional Operational Examples:

The user-control-actuator(s) 104 may also be implemented to function as a pointing device for a personal computer. Because the user simply moves the remote-controller 105 in space (without needing a surface), selecting objects may be easier than with prior art computer-mice that require a surface to operate.

Other equivalent computer-mouse functions may be optionally incorporated into the user-control-actuator(s) 104. For example, the equivalent of a left mouse button may be accomplished by the "select" button of the user-control-actuator(s) 104. Following a selection, the computers active-location (e.g., a blinking symbol) may then be moved to (e.g., indicated at) the location that was "selected" on the active-display 101; or the "selected" object may be highlighted on the active-display 101.

Similarly, the equivalent of a right mouse button [that may cause a set of menu-options to pop-up] may be accomplished with another button [or switch position] in the user-control-actuator(s) 104.

The equivalent of a mouse drag-and-drop function may be accomplished by holding the "select" button down once the cursor 112 is at the object-of-interest and then moving the cursor 112 to the new desired location and then releasing the "select" button. Other computer mouse functions: including selection-of-area; or selection-of-text or designation of the location-of-action, may also be similarly implemented. Distinguishing between a "single-click" and a "double-click" and between the "press-down" and "release" of a button(s) may also be useful in some embodiments.

Configuration-Data:

In some embodiments, configuration-data may be provided to the control-processing 106 to allow the remote-controller 105 to be interoperable with any number of user-devices. Some examples of configuration-data include:

The model-number or other ID of each device being controlled.

A set of control-menus [for each device] that may be displayed on an active-display(s) 101.

Definitions of the selectable-objects in each control-menu.

Definitions of the control actions that may be performed on a user-device when each selectable-object is "selected".

Definitions of the next control-menu or other image-content to display on the active-display when each selectable-object is selected.

For entertainment media (e.g., DVD movie), definitions of the menu-selections for each menu-image included on the DVD.

The communication path (e.g., RF channel) and the specific control encoding necessary to control each of the user's electronic-devices.

The infrared patterns/codes needed to control each of the user's older infrared controllable electronic-devices.

In some embodiments, the configuration data needed for a user-device, may be provided to the control-processing 106 during the initial set-up of that user-device. For example, when a user adds a tenth device 108 to their home-system, the configuration-data for that electronic-device may be input into the control-processing 106 as part of the initial set-up so that the same remote-controller may be used to control all ten devices. The configuration-data may be saved into a non-volatile memory so set-up is required only once per device.

There are many ways that the configuration-data may be provided to the control-processing 106; including:

The configuration-data is provided by the device(s)-being-controlled 108a-108k over the control-network 131.

The device-being-controlled 108a-108k may have a media-drive (e.g., a DVD or CD) that may accept media containing configuration-data.

The configuration-data is provided from the Internet and/or other outside sources of information via a communication or Internet/Network 118 path.

The configuration-data is provided via a media drive 117 (e.g., a DVD or CD) or interface that is attached to the processing.

In one embodiment, when the user adds a new device, the control-processing 106 may access the Internet 118 to obtain the configuration-data needed to remotely-control or interact-with the new device. Configuration-data may also be used to allow the remote-controller to act as a universal remote-control and/or to provide backward-compatibility with older infrared-controlled electronic-devices.

Backward Compatibility with Existing Infrared Remote Controls:

In an optional enhancement, older infrared-controlled electronic-devices may also be controlled. Universal compatibility and/or backward compatible with old infrared user devices may facilitate the easier adoption of some of the disclosed embodiments.

Figure 9:
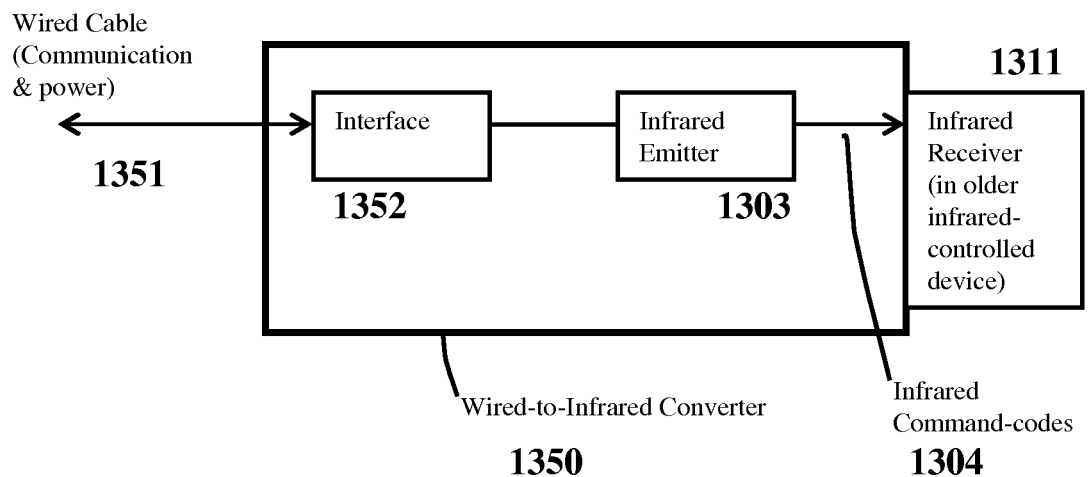
FIG. 9 shows a block diagram of an embodiment of a wired-to-Infrared Converter.
Figure 10:
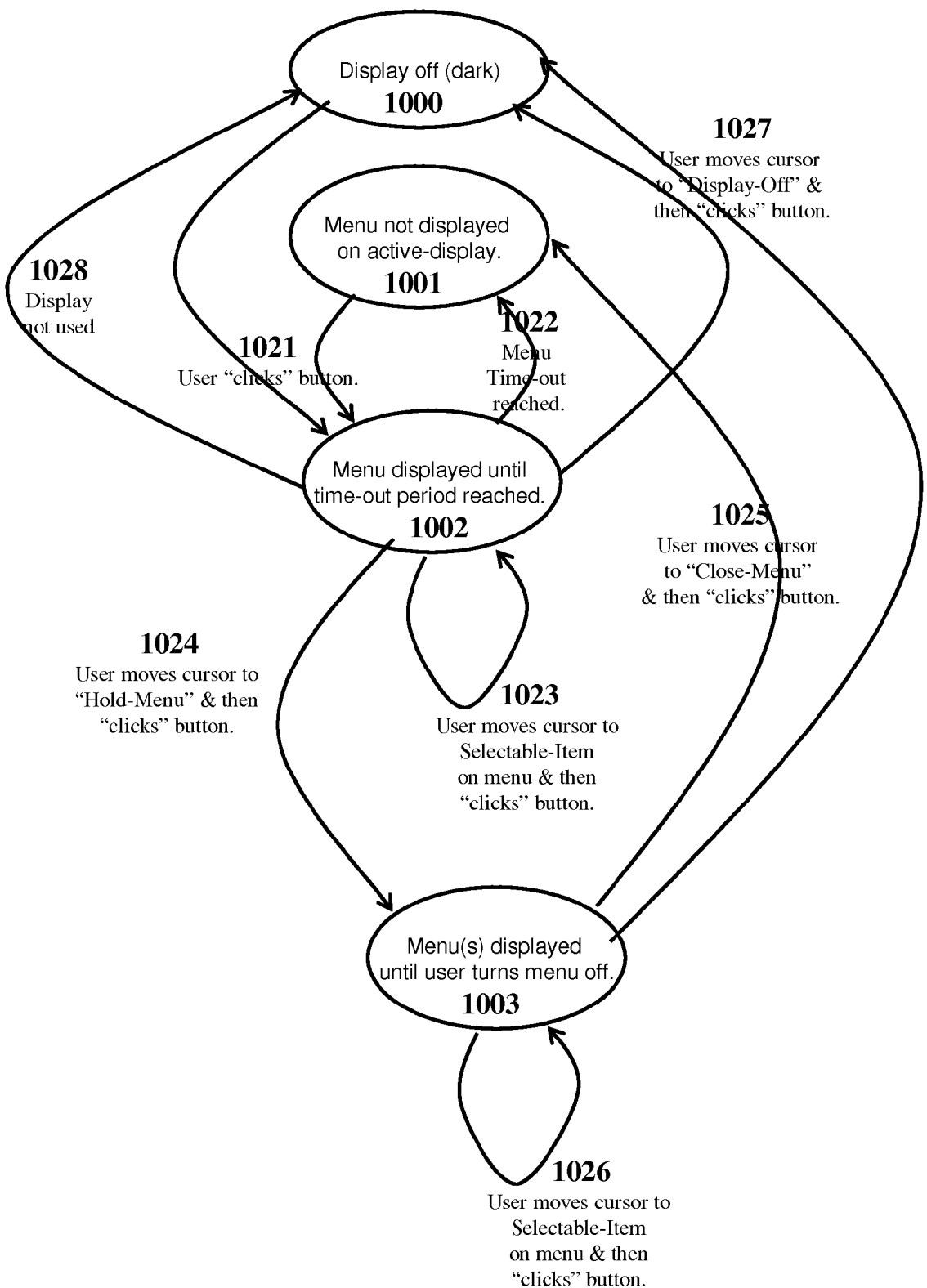
FIG. 10 illustrates one embodiment of a state control diagram for control of the active-display and selection of selectable-objects from display-menus.

In one alternative embodiment shown in FIG. 9, an RF-to-Infrared Converter 1300 may be attached to an older infrared-controlled-device, so that infrared-command-codes 1304 from an infrared-emitter 1303 will reach the infrared-receiver 1311 in the older device. The RF-to-Infrared Converter 1300 may contain an RF-interface 1302 to receive commands [and send status back] over an RF-communication path 1301 with the control-processing 106. The RF-interface may contain a radio-frequency receiver/transmitter that allows non-line-of sight communication from the control-processing 106 to/from the RF-to-Infrared Converter 1300. In some embodiments, the RF-communication-path 1301 may be the same as communication paths shown in FIG. 1. The RF-to-Infrared Converter 1300 may also contain a battery 1305 so that no external wired-connections are need. By attaching an RF-to-Infrared-converter 1300, an older device is no longer constrained to be within infrared-line-of-sight of the remote-controller 105 or the control-processing 106. This may allow some older infrared-controlled devices [e.g., VCR and DVD players] to be placed out of sight of the user.

The control-processing 106 may receive configuration-data from the media-drive(s) 117 and/or Internet/Network 118 and/or Device(s)-Being-Controller 108a-108k that includes all the necessary information for backward compatibility. The configuration-data may include the specific infrared command-sequences needed to communicate each particular control-action to the specific model of electronic-device being controlled. The configuration-data may also include a full set of selection-images or menu-images that may be used to control each infrared controlled electronic-device in the user's system.

The same or similar procedure as that described in FIG. 3 may also be used for older infrared controllable devices; except that in block 306, the control action(s) are communicated via infrared signaling/codes to the device-being-controlled.

For example, while the user is controlling an older infrared controllable television: the control-processing 106 may place the appropriate selection-menus for the television, onto one or more of the active-displays 101 using the configuration-data. The user may then make selections on one or more selection-menus to control the television (e.g., change channel or volume). The control-processing 106 then determines the desired user control-action(s). The processing may then use the configuration-data to generate the appropriate infrared command-sequence for the user's specific model television in-order to cause the desired control-action(s).

In another alternative embodiment, the remote-controller 105 may have an infrared output aperture. The circuitry for the infrared output may be similar to existing infrared remote control devices (e.g., a television or DVD remote-controller). When an older device needs to be controlled, the control-processing 106 may utilize the infrared output [in the remote-controller 105], in-order to send the infrared control-codes that are compatible with the older infrared-controlled electronic device to cause the desired control-action. The infrared output aperture may be aligned to output the infrared-beam in the direct of the active-display.

Computer-Readable Medium and Storage Media:

The processing instructions; programs; software; machine instructions; firmware; configurations of electronically configurable hardware (e.g., Field Programmable Gate Arrays); setup and configuration data; configuration and setup instructions may be stored on one or more computer-readable medium.

The term "computer-readable medium" includes any medium that participates in providing instructions to a processor for execution. Such a medium may take many forms, including, but not limited to; nonvolatile media, volatile media, and transmission media. Nonvolatile media include, for example, optical or magnetic disks or other storage devices. Volatile media include dynamic memory, such as main memory. Transmission media include coaxial cables, copper wire, and fiber optics, including the wires that comprise bus. Transmission media can also take the form of acoustic or light waves, such as those generated during radio frequency (RF) and infrared (IR) data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, EEPROM; a FLASH EPROM, Flash memory; any other memory chip or cartridge, a carrier wave as described hereinafter, or any other medium from which a computer or a processor can read.

Various forms of computer-readable media may be involved in carrying one or more sequences of one or more instructions to one or more processors for execution. For example, the instructions may initially be borne on a magnetic disk of a remote computer. The remote computer can load the instructions into its dynamic memory and send the instructions.

Not Limited to Detailed Illustrations:

It should be noted that the claims should not be limited to the particular details of the above mentioned embodiments. Using this disclosure as a whole, those skilled in the art will be able to design many alternative embodiments without departing from the scope defined in the claims.

To satisfy the requirements for enablement, this disclosure may contain one or more embodiments which illustrate a particular detailed implementation and use. For clarity simplified examples may be chosen for illustration. A detailed illustration often requires choosing only one of a plurality of equivalent detail approaches to describe. When terms such as "shall", "should", "is", "are" appear in this description, they should only be interpreted as limitations/requirements for the purpose of maintaining compatibility/consistency between the elements/parameters of the particular detailed illustration being described. Such terms should not be interpreted as limitations or requirements on the scope of the general inventive concept as disclosed in its entirety.

For example, if element "A", in a detailed embodiment, is shown as having a certain detailed configuration, then mating element "B" in that detailed example may need to have corresponding "mating" limitations; in-order to be compatible and/or interoperable with the detailed element "A". Such mating-limitations on element "B" for compatibility within a detailed illustration, do not define limitations on element "B" within all the possible embodiments that fall within the scope of the invention. If an alternate configuration of element "A" had been selected for illustration purposes, the detail implementation requirements on element "B" for compatibility and interoperable with the element "A" may be very different.

Those skilled in the art will note that the order of execution or performance of the methods illustrated and described herein is not essential, unless otherwise specified. That is, the elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In general, the detailed implementations for the elements of the invention may have many alternate implementations that accomplish the same functional result/objective and are within the scope of the general inventive concept.

What is claimed is:

1. A remote-controller that is handheld, or wearable on a hand or finger(s) of a user, comprising:
   motion-sensors configured to enable a detection of movement of the remote-controller in one or more X, Y or Z dimensions;
   a single control-actuator configured to be actuated by a thumb of the hand of said user that is holding or wearing said remote-controller;
   electronic circuitry to detect that said user has actuated said control-actuator;
   a wireless interface;
   wherein, when a first action by said user on said control-actuator is detected: a control signal is sent across said wireless interface to turn-on an active-display, and cause selectable-objects and a cursor or point-of-action, to appear on said active-display; wherein data derived from said motion-sensors is sent across said wireless interface to cause the cursor or point-of-action, to move on said active-display in relation to the movement of the remote-controller by said user; wherein when a second action by said user on said control-actuator is detected: a selectable-object that the cursor or point-of-action is on or near is selected, and communication of at least one control-command to at least one electronic-device is initiated.

2. Apparatus as in claim 1 wherein said control-actuator only moves in a substantially single axis when actuated by said user.

3. Apparatus as in claim 1 wherein said control-actuator is a push button switch.

4. Apparatus as in claim 1 wherein said control-actuator only moves in a substantially single axis when actuated by said user; wherein said first action: is to move said control-actuator from an off-position into a second position and then release said control-actuator so it returns to said off-position; and wherein said second action is to move said control-actuator from said off-position into said second position and then release said control-actuator so it returns to said off-position.

5. Apparatus as in claim 1 wherein said control-actuator has a first position and a second position; wherein said first action is to move said control-actuator from said first position to said second position; wherein said second action is to release said actuator from said second position; and wherein when released, said actuator automatically springs back to said first position.

6. Apparatus as in claim 1 wherein said control-actuator has a first, second and third position; wherein said first action is to push said control-actuator from said first position to said second position; and wherein said second action is to move said actuator from said second position to said third position.

7. Apparatus as in claim 1 wherein said remote-controller is wearable by said user, and has an opening that is fits on the hand or finger(s) of said user.

8. Apparatus as in claim 1 wherein said remote-controller is wearable by said user, and has an opening that accommodates one finger of said user.

9. Apparatus as in claim 1 wherein said remote-controller is wearable by said user, and has an opening that accommodates at least one of: two fingers, three fingers, or four fingers, of said hand of said user.

10. Apparatus as in claim 1 wherein said remote-controller is wearable by said user, and has an opening to accommodate the hand or finger(s) of said user; and wherein a size of said opening is adjustable to accommodate different hand and/or finger sizes of a plurality of different users.

11. Apparatus as in claim 1 wherein said motion-sensors are MEMS motion sensors.

12. Apparatus as in claim 1 wherein said motion-sensors are accelerometers, inertial sensors, inertial measurement units, MEMS motion sensors, and/or gyroscopes.

13. Apparatus as in claim 1 wherein said motion-sensors detect translational movement of said remote-controller in two dimensions of space; and wherein said dimensions correspond to two dimensions on a two dimensional active-display.

14. Apparatus as in claim 1 wherein said motion-sensors detect translational movement of said remote-controller in three dimensions of space; wherein said dimensions correspond to: three dimensions on a three dimensional active-display or three dimensions that are represented on a two dimensional active-display.

15. Apparatus as in claim 1 wherein said motion-sensors detect translational movement of said remote-controller in two dimensions of space; and wherein said dimensions correspond to up-down and left-right on a two dimensional active-display.

16. Apparatus as in claim 1 wherein said motion-sensors detect translational movement of said remote-controller in three dimensions of space; and wherein said dimensions correspond to up-down, left-right, and forward-back on a three dimensional active-display.

17. Apparatus as in claim 1 wherein selectable-objects are removed from said active-display(s), when no activations of said control-actuator have occurred for a defined amount of time.

18. Apparatus as in claim 1 wherein activities resulting from said first action are undone, unless said second action is detected before a time-out period has elapsed.

19. Apparatus as in claim 1 wherein a virtual image of a physical remote-controller having a plurality of buttons, is displayed on said active-display and at least some of said buttons on said virtual image are selectable-objects.

20. Apparatus as in claim 1 wherein a plurality of virtual images of different physical remote-controllers, each having a plurality of buttons, is displayed on said active-display and at least some of said buttons on each said virtual image are selectable-objects.

21. Apparatus as in claim 1 wherein said wireless interface communicates to control-processor(s) that sends a plurality of control-commands, to one or more electronic-devices.

22. Apparatus as in claim 21 wherein said wireless interface communicates to control-processor(s) that sends a plurality of control-commands across one or more networks, to a plurality of electronic-devices.

23. Apparatus as in claim 1 wherein said wireless interface communicates to control-processor(s) that sends a plurality of control-commands across one or more networks, to a plurality of electronic-devices; wherein the network automatically incorporates a newly connected electronic-device into the network, or automatically removes a newly disconnected electronic-device from the network; wherein selectable-objects for the newly connected electronic-device are automatically included in said active-display; and wherein selectable-objects for the newly disconnected electronic-device are automatically removed from said active-display.

24. Apparatus as in claim 1 wherein at least one of said selectable-objects, when selected, causes said active-display to be turned-off.

25. Apparatus as in claim 1 wherein said motion-sensors comprise inertial measurement system(s) or inertial measurement sensor(s).

26. Apparatus as in claim 1 wherein said motion-sensors enable distinguishing between rotation of said remote-controller and non-rotational movement of said remote-controller in said X, Y or Z dimensions.

27. Apparatus as in claim 1 wherein said motion-sensors sense both rotational and non-rotational movement(s), so that translational movement of the remote-controller in said X, Y and/or Z directions are distinguishable from rotational movements.

28. Apparatus as in claim 1 wherein an amount that said cursor or point-of-action moves on the active-display relative to an amount of translational movement of the remote-controller in space, is automatically configured by control-processing, based on dimension or size of said active-display.

29. Apparatus as in claim 1 wherein an amount that said cursor or point-of-action moves on the active-display relative to an amount of translational movement of the remote-controller in space, is automatically configured by control-processing, based on a precision needed to select selectable-objects on said active-display.

30. Apparatus as in claim 1 wherein, when said remote-controller is activated, the cursor or point-of-action is placed at a predefined starting location on said active-display, in-order to remove longer-term position drift that occurs between two different usages or activations of said remote-controller.

31. Apparatus as in claim 1 wherein said active-display is separate from said electronic-device(s) being controlled.

32. Apparatus as in claim 1 wherein said first action by said user on said control-actuator also causes said active-display to be turned-on; and wherein selection of a defined selectable-object on said active-display causes said active-display to be turned-off.

33. Apparatus as in claim 1 wherein said wireless interface is a radio frequency interface.

34. A remote-controller that is wearable on a hand or finger(s) of a user, comprising:
- an opening that is sized to wear on the hand or finger(s) of said user;
- motion-sensors configured to enable a detection of movement of the remote-controller in one or more X, Y, or Z dimensions;
- a single control-actuator configured to be actuated by a thumb of the hand of said user that is wearing said remote-controller;
- electronic circuitry to detect that said user has actuated said control-actuator;
- a wireless interface;
- wherein, when a first action by said user on said control-actuator is detected: a control signal is sent across said wireless interface to turn-on an active-display, and cause selectable-objects and a cursor or point-of-action, to appear on said active-display; wherein data derived from said motion-sensors is sent across said wireless interface to cause the cursor or point-of-action, to move on said active-display in relation to the movement of the remote-controller by said user;
- wherein when a second action by said user on said control-actuator is detected: a selectable-object that the cursor or point-of-action is on or near is selected, and communication of at least one control-command to at least one electronic-device is initiated.

35. A remote-controller that is handheld by a user, comprising:
- motion-sensors configured to enable a detection of movement of the remote-controller in one or more X, Y or Z dimensions;

a single control-actuator configured, to be actuated by a thumb of a hand of said user that is holding said remote-controller;

electronic circuitry to detect that said user has actuated said control-actuator and a wireless interface;

wherein, when a first action by said user on said control-actuator is detected: a control signal is sent across said wireless interface to turn-on an active-display, and cause selectable-objects and a cursor or point-of-action, to appear on said active-display; wherein data derived from said motion-sensors is sent across said wireless interface to cause the cursor or point-of-action, to move on said active-display in relation to the movement of the remote-controller by said user;

wherein when a second action by said user on said control-actuator is detected: a selectable-object that the cursor or point-of-action is on or near is selected, and communication of at least one control-command to at least one electronic-device is initiated.

* * * * *